United States Patent
Foster

(10) Patent No.: US 6,575,293 B2
(45) Date of Patent: *Jun. 10, 2003

(54) CONNECTOR AND CONNECTION METHOD FOR CONVEYOR SLATS

(76) Inventor: Raymond Keith Foster, P.O. Box 1, Madras, OR (US) 97741

( * ) Notice: Subject to any disclaimer, the term of this patent is extended or adjusted under 35 U.S.C. 154(b) by 29 days.

This patent is subject to a terminal disclaimer.

(21) Appl. No.: 09/900,376

(22) Filed: Jul. 5, 2001

(65) Prior Publication Data

US 2002/0046927 A1 Apr. 25, 2002

Related U.S. Application Data

(63) Continuation-in-part of application No. 09/610,037, filed on Jul. 5, 2000, now Pat. No. 6,409,009.

(51) Int. Cl.$^7$ ............................................. B65G 25/04
(52) U.S. Cl. ................... 198/750.2; 198/750.4
(58) Field of Search ................ 198/750.2, 750.3, 198/750.4, 750.6, 750.14

(56) References Cited

U.S. PATENT DOCUMENTS

| | | | | |
|---|---|---|---|---|
| 5,323,894 A | * | 6/1994 | Quaeck | 198/750.4 X |
| 5,560,472 A | * | 10/1996 | Gist | 198/750.3 |
| 5,996,772 A | * | 12/1999 | Foster | 198/750.4 X |
| 6,000,530 A | * | 12/1999 | Foster | 198/750.6 |
| 6,409,009 B1 | * | 6/2002 | Foster | 198/750.2 |

* cited by examiner

Primary Examiner—James R. Bidwell
(74) Attorney, Agent, or Firm—Delbert J. Barnard

(57) ABSTRACT

Conveyor slat bottom flanges (78, 80) are positioned vertically between side portions of upper and lower clamp members (52, 54). The upper clamp member (52) is within the conveyor slat (70) and its side portions are above the conveyor slat flanges (78, 80). The lower clamp member (54) is welded or otherwise secured to a transverse drive beam (56). Its side portions are below the conveyor slat bottom flanges (78, 80). Bolts (164) project upwardly through openings in the transverse drive beam (56) and the lower clamp member (54) and thread into threaded openings (160) in the upper clamp member (52). Or, bolts (170) extend downwardly from the upper clamp part (52) through openings in the lower clamp part (54) and openings in the drive beam (56), to nuts (170) that are below the drive beam (56). Tightening of the bolts (170) causes the conveyor slat bottom flanges (78, 80) to be clamped between the two clamp members (52, 54). This secures the conveyor slats (70) to the transverse drive beam (56) without the need of forming fastener holes in the top (72) of the conveyor slat (70).

57 Claims, 20 Drawing Sheets

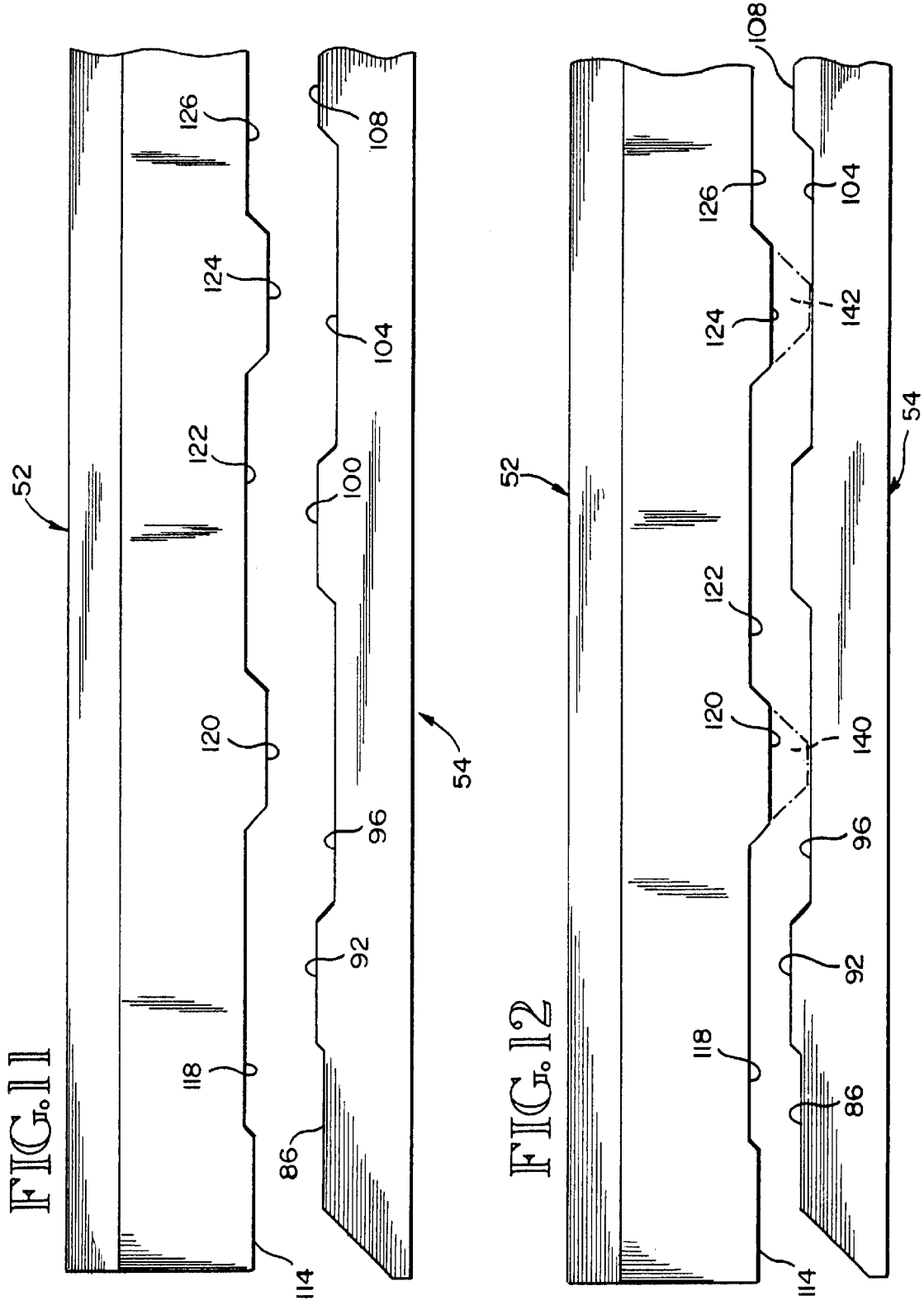

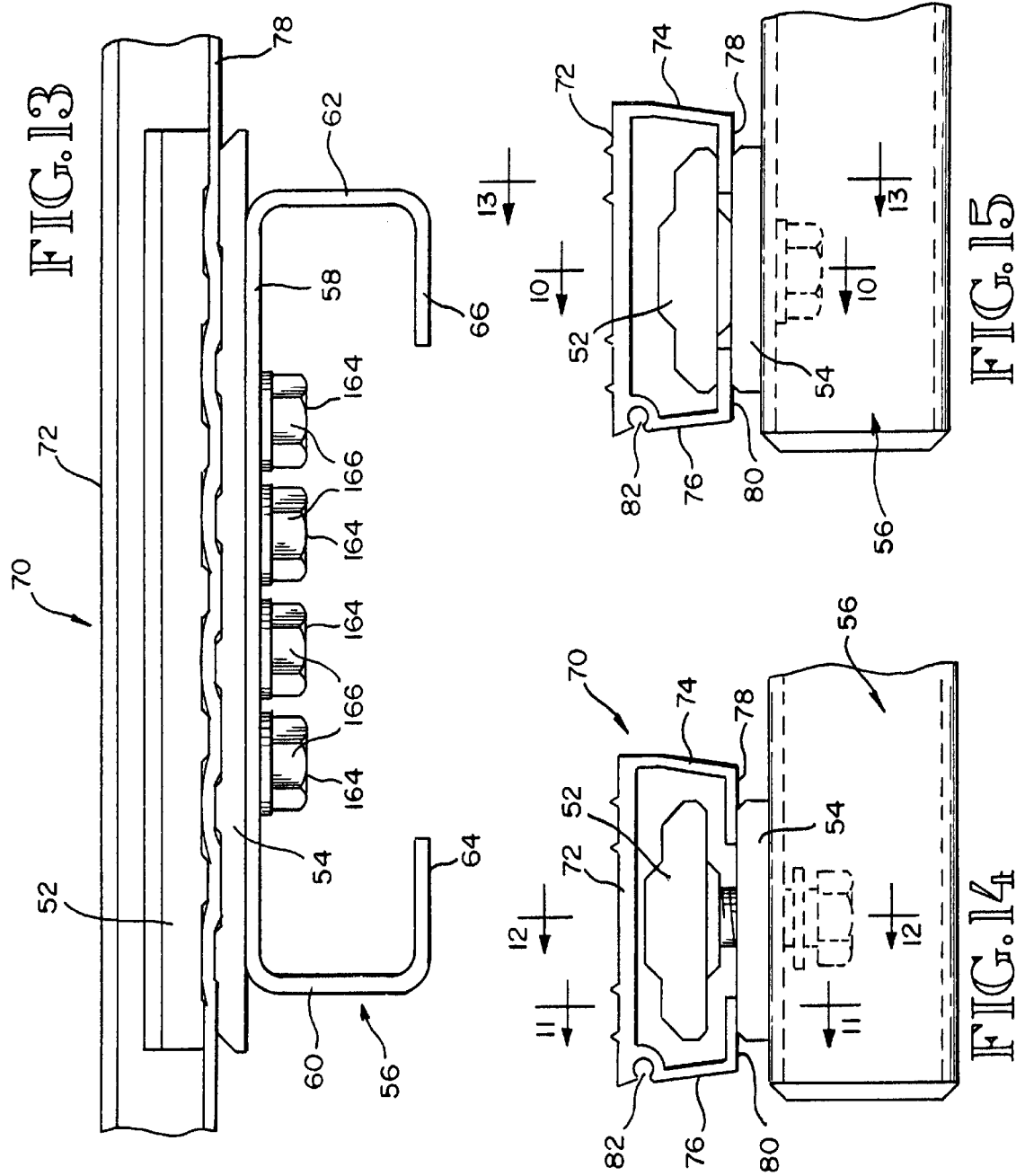

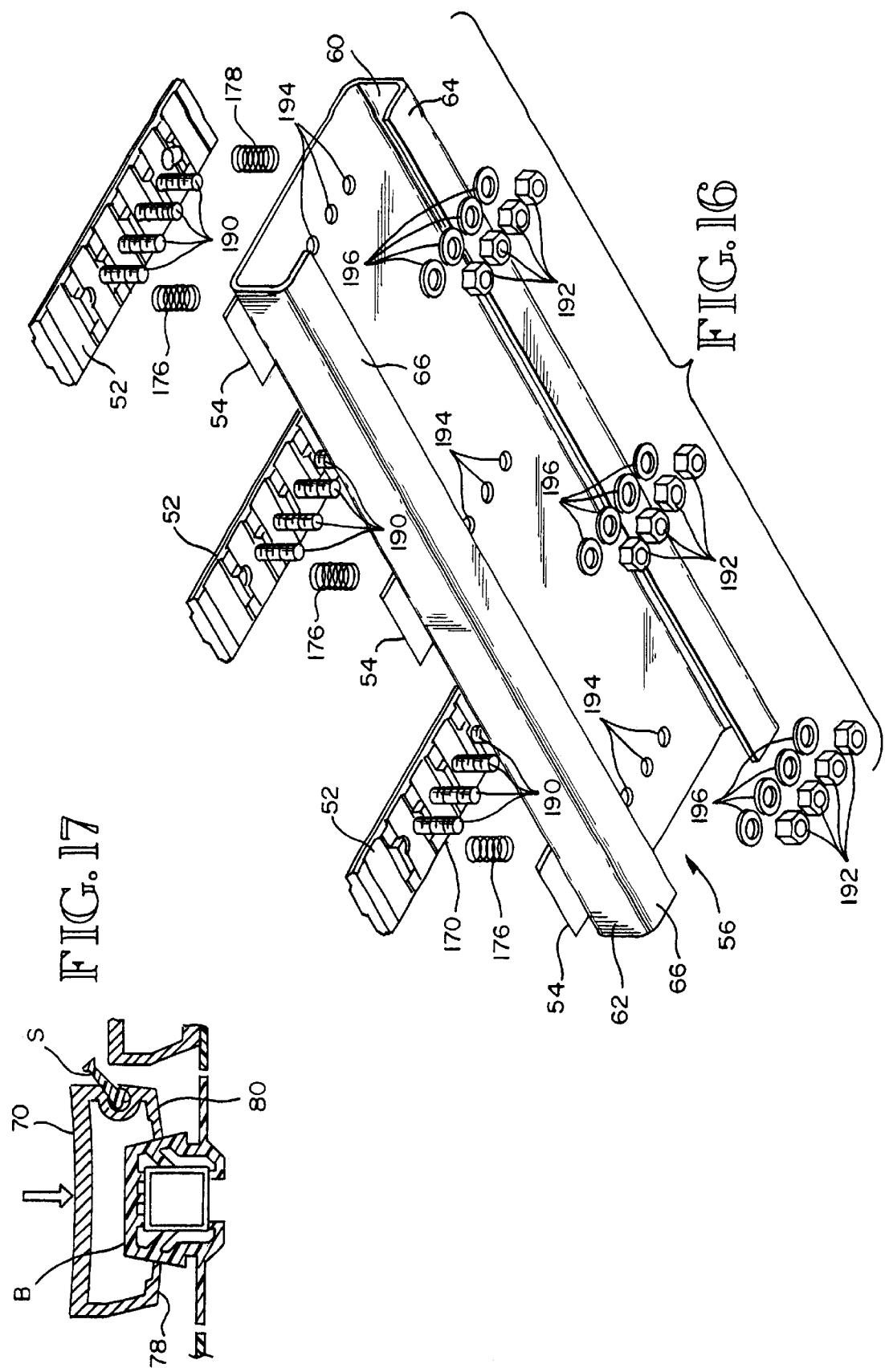

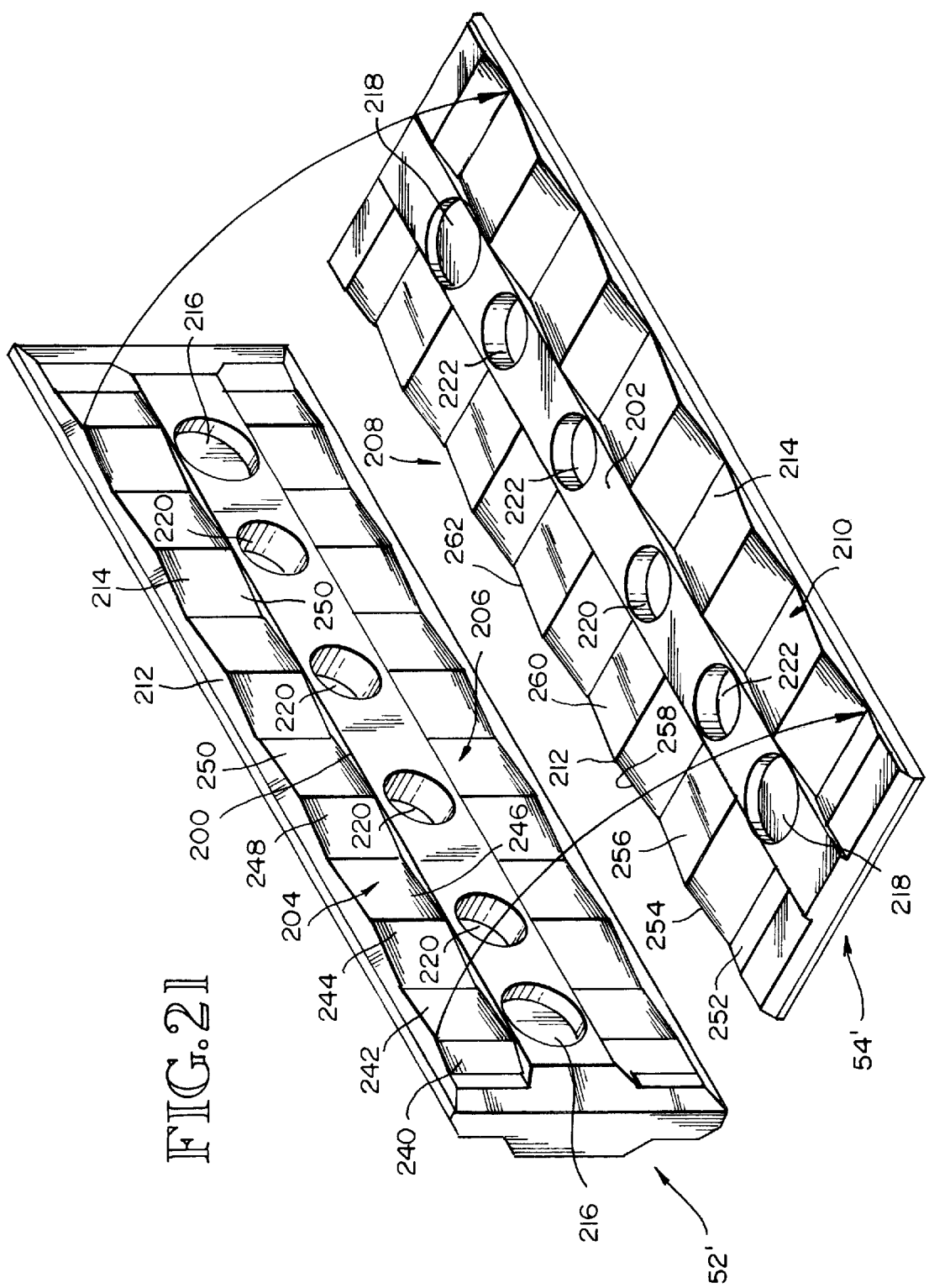

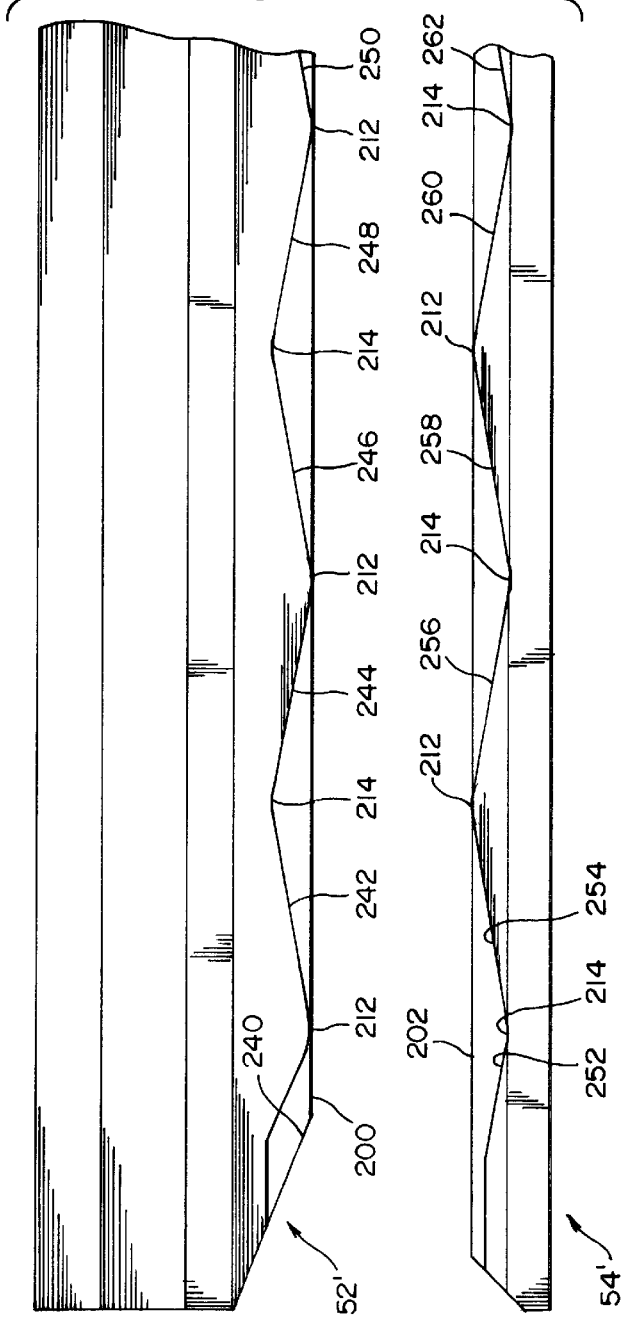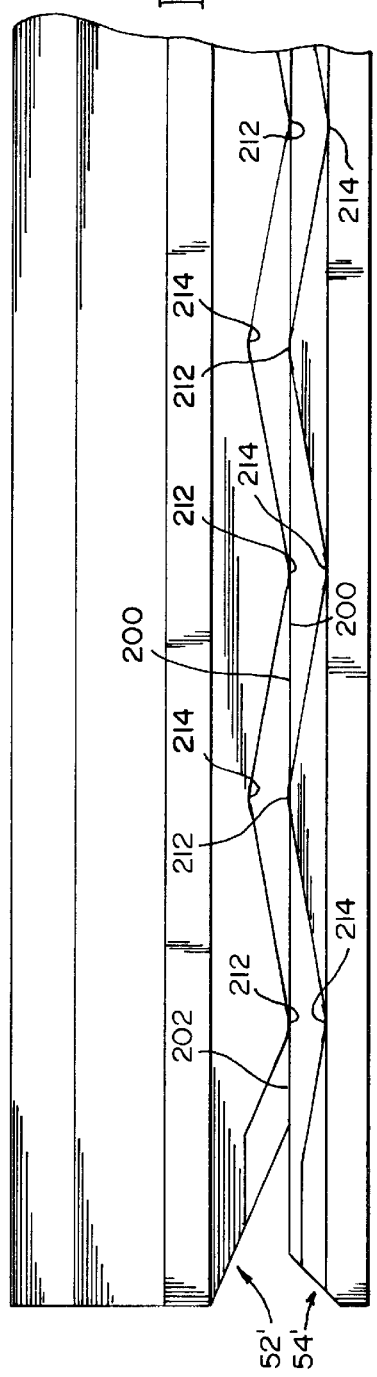

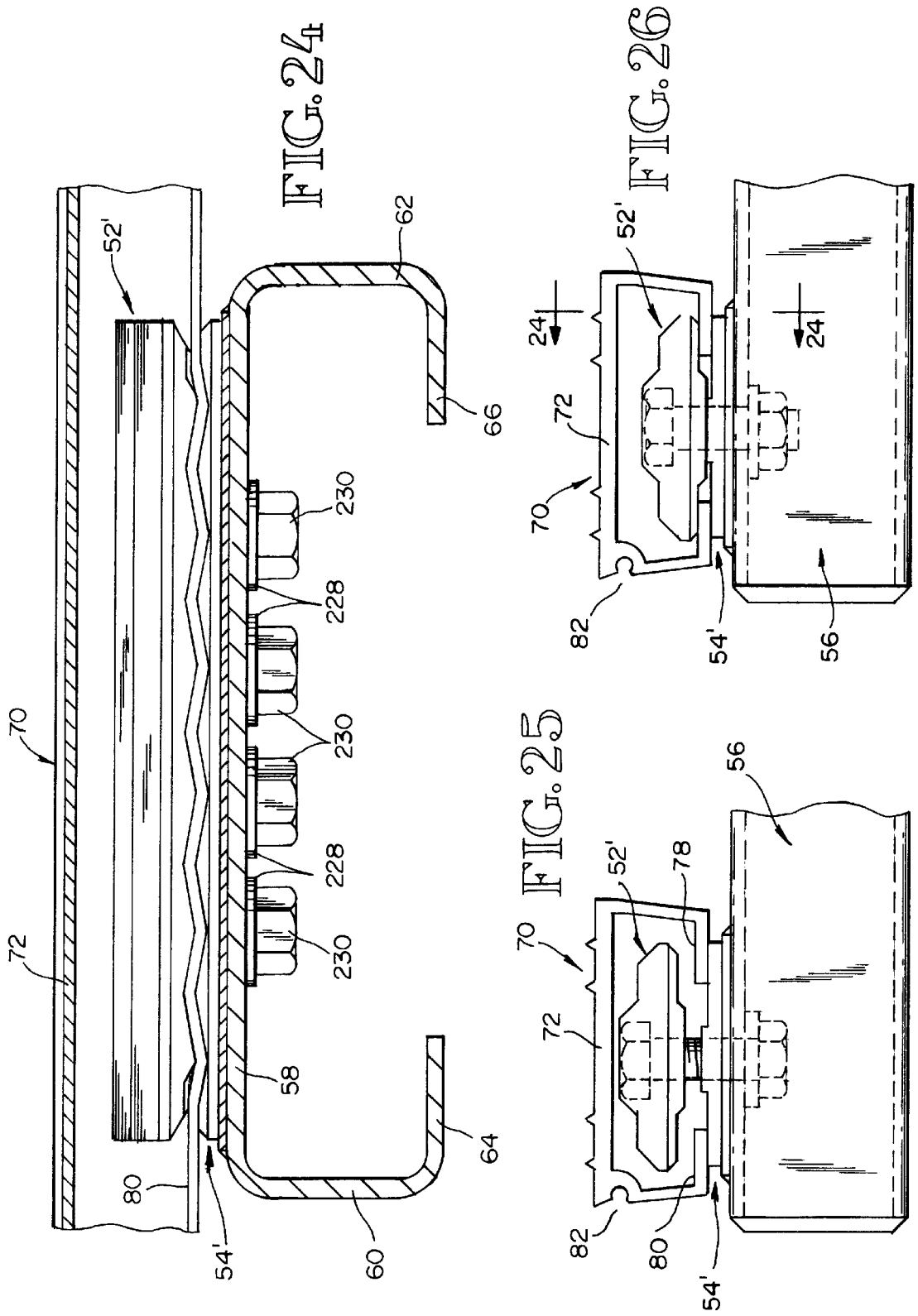

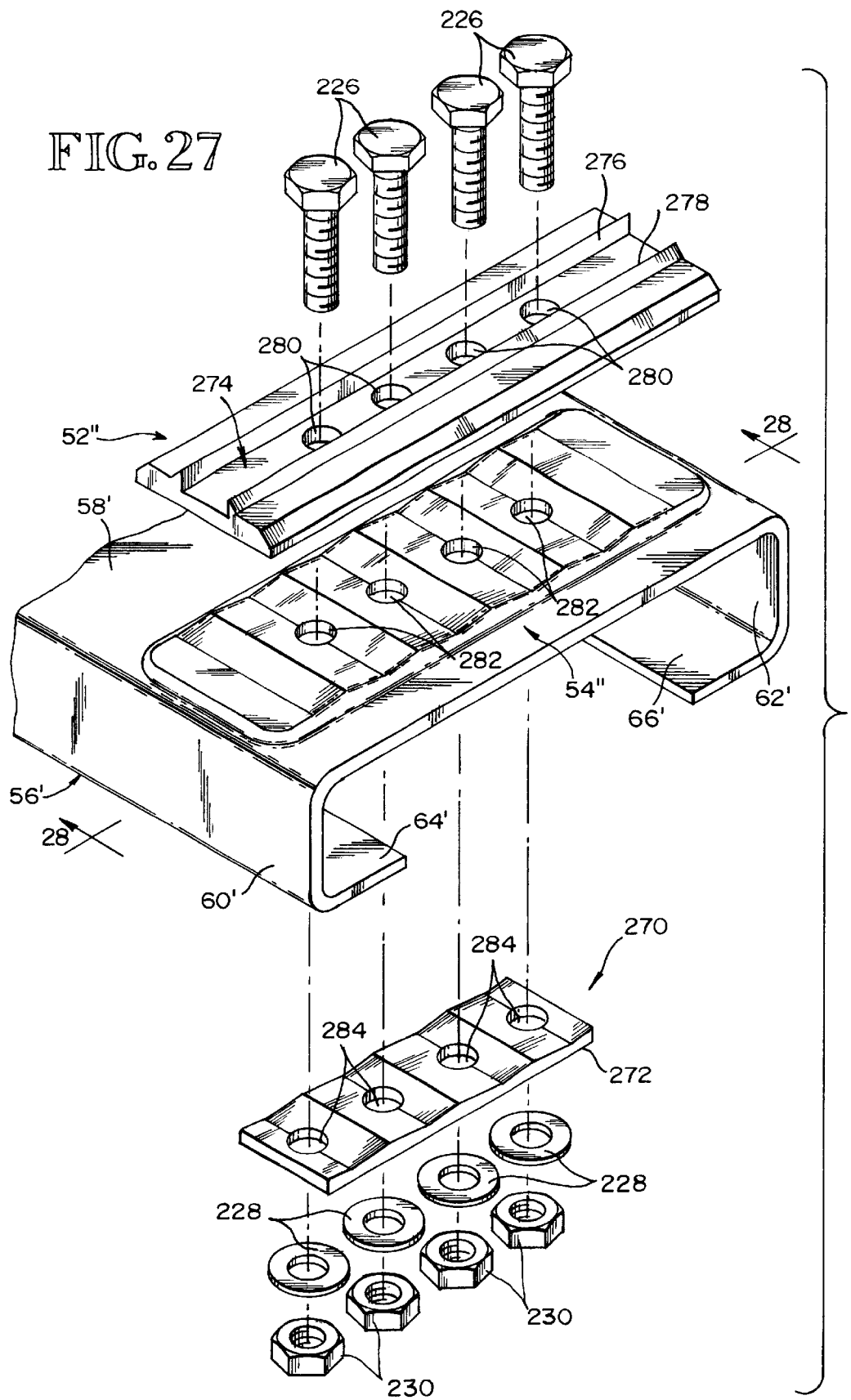

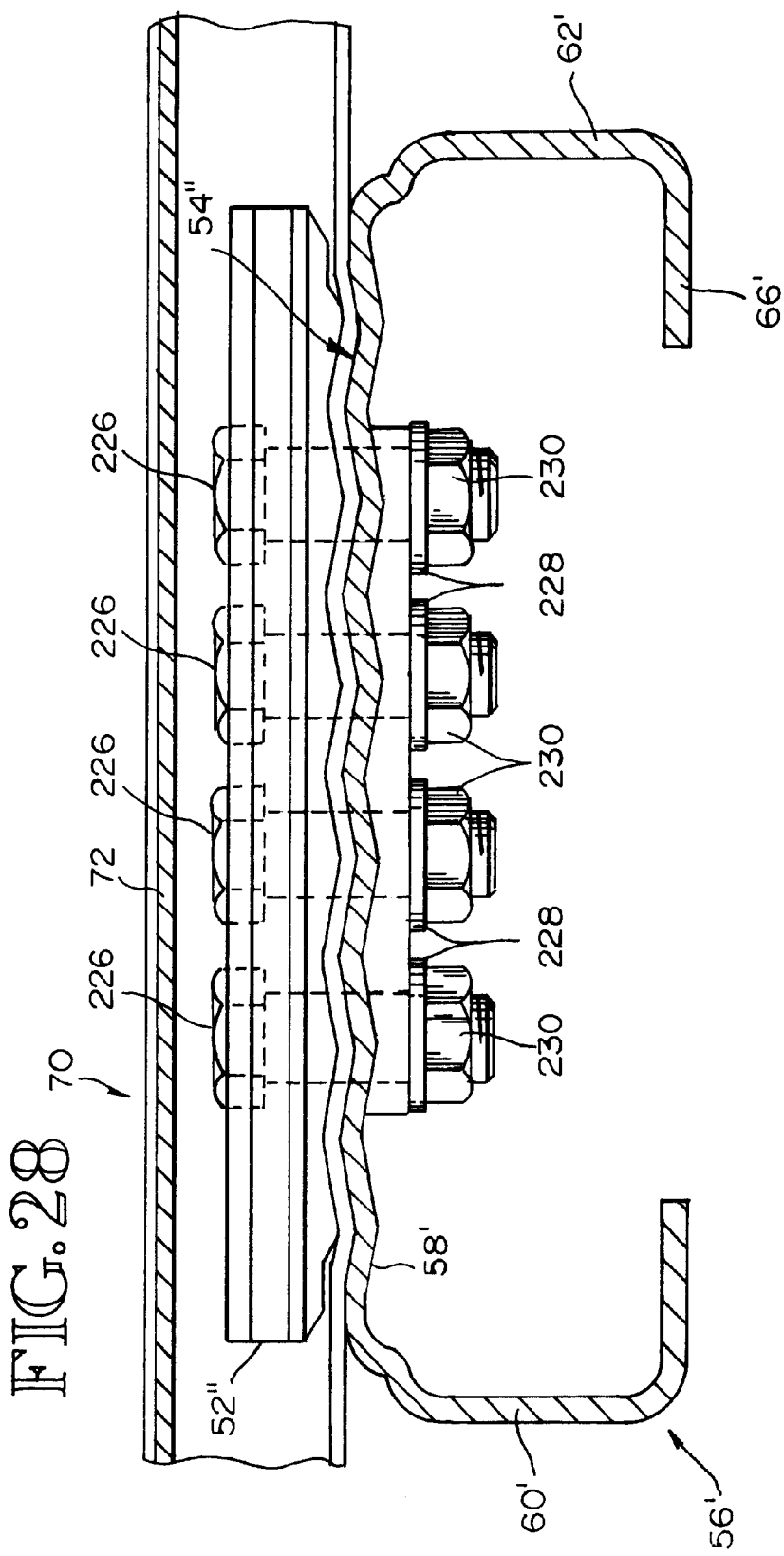

CONNECTOR AND CONNECTION METHOD FOR CONVEYOR SLATS

RELATED APPLICATION

This application is a continuation-in-part of U.S. Ser. No. 09/610,037, filed Jul. 5, 2000, entitled Conveyor Slats Connector And Connection Method, and now U.S. Pat. No. 6,409,009 B1, granted Jun. 25, 2002.

TECHNICAL FIELD

This invention relates to reciprocating slat conveyors. More particularly, it relates to a method and apparatus for connecting conveyor slats to transverse drive beams by clamping onto bottom flange portions of the conveyor slats.

BACKGROUND OF THE INVENTION

A reciprocating slat conveyor comprises a plurality of conveyor slats that are mounted adjacent each other for longitudinal reciprocation. A typical reciprocating slat conveyor system is disclosed by U.S. Pat. No. 4,793,469, granted Dec. 27, 1988, and entitled Reduced Size Drive/Frame Assembly For A Reciprocating Floor Conveyor. The conveyor slats are divided into three sets, identified by the numerals "1", "2" and "3", respectively. The slats are arranged in a plurality of groups, with each group including adjacent slats, one from each set. Referring to FIGS. 2-6 of U.S. Pat. No. 4,793,469, advancement of a load "L" is accomplished by the simultaneous movement of all three sets of slats. The slats are then retracted, one set at a time. The conveyor includes three transverse drive beams, one for each set of slats. The slats of each set are connected to the corresponding drive beam by a plurality of connectors that are attached to the drive beam. Each drive beam is connected to a drive motor that is operated for selectively reciprocating the drive beam and the slats that are connected to it. The slats are also supported by bearings positioned over longitudinal guide beams.

FIG. 1 herein is like FIG. 11 in U.S. Pat. No. 4,793,469. It shows a drive assembly comprising a frame 10, three drive units 12, three transverse drive beams 14 and slat connectors 16 for twenty-four slats 18 (FIG. 2 herein). In the conventional procedure for installing a reciprocating slat conveyor, the drive assembly is first installed. Then, the conveyor slats 18 are positioned above the drive assembly. A worker goes below the drive assembly and drills upwardly through openings in the connectors 16 to form corresponding openings in each slat 18. Then, a nut is held in place below the connector 16 while a bolt is inserted through the drilled hole in the slat from above the slat and is threaded into the nut. This conventional procedure is cumbersome due to the need to drill metal parts at a location in the field, removed from the fabrication facility, and the necessity for a worker to access the area below the drive assembly.

U.S. Pat. No. 6,000,530, granted Dec. 14, 1999, and entitled Drive Beam Connector And Connection Method provides a specific connector for securing the conveyor slats to the transverse drive beams without requiring access to the area below the drive beams. It also provides for the use of conveyor slats that are predrilled in the fabrication facility, making it unnecessary to drill the conveyor slats in the field. FIG. 2 herein shows a conveyor slat 18 connected to a connector 16 that includes the floating nut bar 20 that is inside the connector 16. The connector 16 is connected to a transverse drive beam 14 by a series of bolts 22. The nut bar 20 is in a space 24 inside the connector 16. The top 26 of the conveyor slat 18 is provided with predrilled openings 28 that are sized and shaped to receive the heads 30 of screw fasteners 32. Openings 28 are countersunk openings and the fastener heads 30 are shaped to fit down into the countersinks. Threaded shank portions 36 of the screw fasteners 32 thread into a threaded opening 38 in the nut bar 20. The nut bar 20 floats sideways and allows the threaded shanks 36 of the screw fasteners to mate with the threaded opening 38. Bolts 22 hold the connector base 40 tight against the drive beam 14. Screw fasteners 32 hold the slat top 26 tight against the connector top 42.

While developing the invention that is disclosed and claimed in U.S. Pat. No. 6,000,530, it became apparent that there was a need for a way of securing conveyor slats to the drive beams without the use of screw fastener holes in the conveyor slats. The primary object of the present invention is to provide such a system.

BRIEF SUMMARY OF THE INVENTION

The present invention is directed to an apparatus and method for connecting a reciprocating conveyor slat having an inner space and laterally spaced apart bottom flanges to a drive beam that is situated below the bottom flanges. The apparatus is basically characterized by an upper clamp member that is fittable into the inner space of the conveyor slat and which has side portions positionable above the bottom flanges. A lower clamp member is connected to the drive beam. It has side portions that are below the bottom flanges of the conveyor slat. The conveyor slat is positioned to place its bottom flanges vertically between the side portions of the upper and lower clamp members. Then a bolt or bolts are tightened to pull the upper clamp member downwardly so as to firmly clamp the bottom flanges of the conveyor slat between the side portions of the upper and lower clamp members. The clamp members firmly grip onto the bottom flanges of the conveyor slat, firmly connecting the conveyor slat to the drive beam, without the need or use of fasteners that extend through openings in the top of the conveyor slat.

The bolt may have a head and a threaded shank and be insertable upwardly through openings in the drive beam and the lower clamp member and be threadable into a threaded opening in the upper clamp member. Or, the bolt may project downwardly from the upper clamp member, through openings in the lower clamp member and the drive beam, and be connected to a nut that is below the drive beam. In the first embodiment, a wrench is attached to the bolt head and is rotated to move the threaded shank of the bolt into a threaded opening in the upper clamp member. In the second embodiment, the wrench is attached to the nut and is used for threading the nut onto the threaded shank of the bolt. In both embodiments, the movement of the threaded shank of the bolt through the threaded openings in the upper clamp member or the threaded openings in the nut acts to pull the upper clamp member downwardly so as to firmly clamp the bottom flanges of the conveyor slat between the side portions of the upper and lower clamp members.

Preferably, at least one spring is positioned vertically between the upper and lower clamp members. The spring is of a size and strength sufficient to urge the upper clamp member away from the lower clamp member when the bolt is loosened. Initially, the bolt is tightened to such an extent that the upper clamp member is connected to the lower clamp member and the drive beam but the side portions of the upper clamp member are spaced vertically above the side portions of the lower clamp member an amount sufficient to allow movement of the bottom flanges of the conveyor slat into a position vertically between the upper and lower clamp members.

In preferred form, a plurality of bolts are employed. They are spaced apart longitudinally of the conveyor slat and are positioned laterally between the bottom flanges of the conveyor slat. Preferably also, at least two springs are used. The springs are spaced apart longitudinally of the conveyor slat. The upper clamp member may be formed to include a downwardly directed upper socket for each spring, to receive the upper end portion of the spring. The lower clamp member would then be formed to include an upwardly directed lower socket for each spring, for receiving the lower end portion of the spring.

According to an aspect of the invention, the side portions of the upper clamp member have recesses and projections that are directed downwardly towards the side portions of the lower clamp member. The side portions of the lower clamp member have recesses and projections that are directed upwardly towards the side portion of the upper clamp member above it. The projections on each clamp member are in general alignment with the recesses on the other clamp member. As a result, when the bolts are tightened, the projections and recesses are moved together and against the bottom flanges of the conveyor slat. They form wrinkles in the bottom flanges and these wrinkles serve to resist relative longitudinal movement of the conveyor slat relative to the transverse drive beam when a drive force is applied.

In preferred form, each side portion of the upper clamp member has opposite end parts and each side portion of the lower clamp member has complementary end parts. When the bolt(s) are tightened, the upper and lower end parts make clamping contact with upper and lower surfaces of the conveyor slat flanges. The recesses and projection are longitudinally between the opposite end parts of the side portions of the clamp members. The end parts grip the bottom flanges of the conveyor slat without deforming them. The projections and recesses deform the bottom flanges of the conveyor slat in their extent longitudinally between the end parts.

According to a method aspect of the invention, the conveyor slat is positioned so as to position the upper clamp member inside of the conveyor slat, horizontally between the side parts of the conveyor slat and vertically between the top and the bottom flanges of the conveyor slat. The bottom flanges of the conveyor slat are positioned vertically between the clamping surfaces of the side portions of the clamp members. The bolt is tightened so as pull the upper clamp member downwardly and firmly clamp the bottom flanges of the conveyor slat between the side portions of the upper and lower clamp members. One of the clamp members may include stop lugs that are laterally between the bottom flanges of the conveyor slat. These stop lugs make contact with the other clamp member and limit the amount of movement of the clamping surfaces together.

The invention also includes providing the conveyor slats with slide bearings onto which the conveyor slats can be snap fitted. The conveyor slats are positioned over the bearings and over the lower clamp members, with the bolts aligned with bolt receiving openings in the lower clamp member. Then, the conveyor slats are pushed downwardly so as to snap the conveyor slats onto the bearings and move the bolts through the bolt receiving openings in the lower clamp member. Then, from below the drive beam, a nut is attached to each bolt and is tightened so that the upper clamp members will be drawn downwardly into clamping engagement with the conveyor slat bottom flanges.

The lower clamp members may be made separate from the transverse drive beams and then welded or otherwise secured to the transverse drive beams. Also, the lower clamp members may be formed portions of the top panels of the transverse drive beams. Upper and lower dies positioned above and below the upper panels of the transverse drive means may be forced together to deform the metal between them to in that manner form undulating clamping surfaces.

Also, the lower clamp member regions may be formed in a central portion of a flat panel of sheet member and then the panel of sheet member may be bent to form a channel.

The upper clamp members may be formed to include sockets for receiving either bolt heads or nuts. Each socket will have spaced a part wrench surfaces that engage opposite side surfaces of the bolt head or the nut. Each upper clamp member may be formed to include a plurality of sockets, each sized to receive a bolt head or a nut. The wrench surfaces of such sockets may extend transversely of the upper clamp member. Or, each upper clamp member may include a longitudinal channel having sidewalls which function as the wrench surfaces.

The upper and lower clamp members may be formed to include center portions between side portions which are adapted to contact each other and space the side portions vertically apart. The central portions may be continuous or segmented.

The upper and lower clamp members may include undulating clamp surfaces that extend laterally across the widths of the clamp members.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals refer to like parts throughout the several views of the drawing, and:

FIG. 11 is an enlarged scale fragmentary view of the left end portion of FIG. 9, but showing clearance stops omitted;

FIG. 12 is a view similar to FIG. 11, but including broken lines showings of the clearance stops in contact with the surfaces below them, so as to define an undulating spaces between the side portions of the upper and lower clamp members provided to receive a conveyor slat flange;

FIG. 13 is a view similar to FIG. 10, but on a smaller scale, such view being a sectional view substantially through line 13—13 of FIG. 15;

FIG. 14 is a cross sectional view through a conveyor slat in the vicinity of a clamp assembly, showing the upper clamp members spaced above the lower clamp members;

FIG. 15 is a view like FIG. 14, but showing the bolts tightened to draw the upper clamp member downwardly into contact with the conveyor slat flange;

FIG. 16 is a view like FIG. 6, but with the bolt projecting downwardly from the upper clamp part through openings in the lower clamp part and the drive beam, to nuts below the drive beam, and with the slats omitted; and FIG. 17 is a fragmentary sectional view through a snap-on bearing positioned on a support and guide tube for the bearing, such view showing a conveyor slat in the process of being snap fitted onto the bearing;

FIG. 21 is a pictorial view of the connector components shown by FIG. 20, such view showing the upper component swung over in position relative to the lower component so that the mating faces of the two components can both be seen in the view;

FIG. 22 is a view like FIG. 9 but of the connector components of the second embodiment;

FIG. 23 is a view like FIG. 22 but showing the upper component lowered to place its center part in contact with the center part of the lower connector component;

FIG. 24 is a transverse sectional view like FIG. 13 but taken along line 24—24 of FIG. 26;

FIG. 25 is a fragmentary elevational view like FIG. 14;

FIG. 26 is a fragmentary elevational view like FIG. 15;

FIG. 27 is a fragmentary pictorial view of a third embodiment of the invention, such embodiment including a lower connector component that is stamped into the upper panel of the transverse drive beam; and FIG. 28 is a cross sectional view substantially along line 28—28 of FIG. 27.

DETAILED DESCRIPTION OF THE INVENTION

Figure 1:
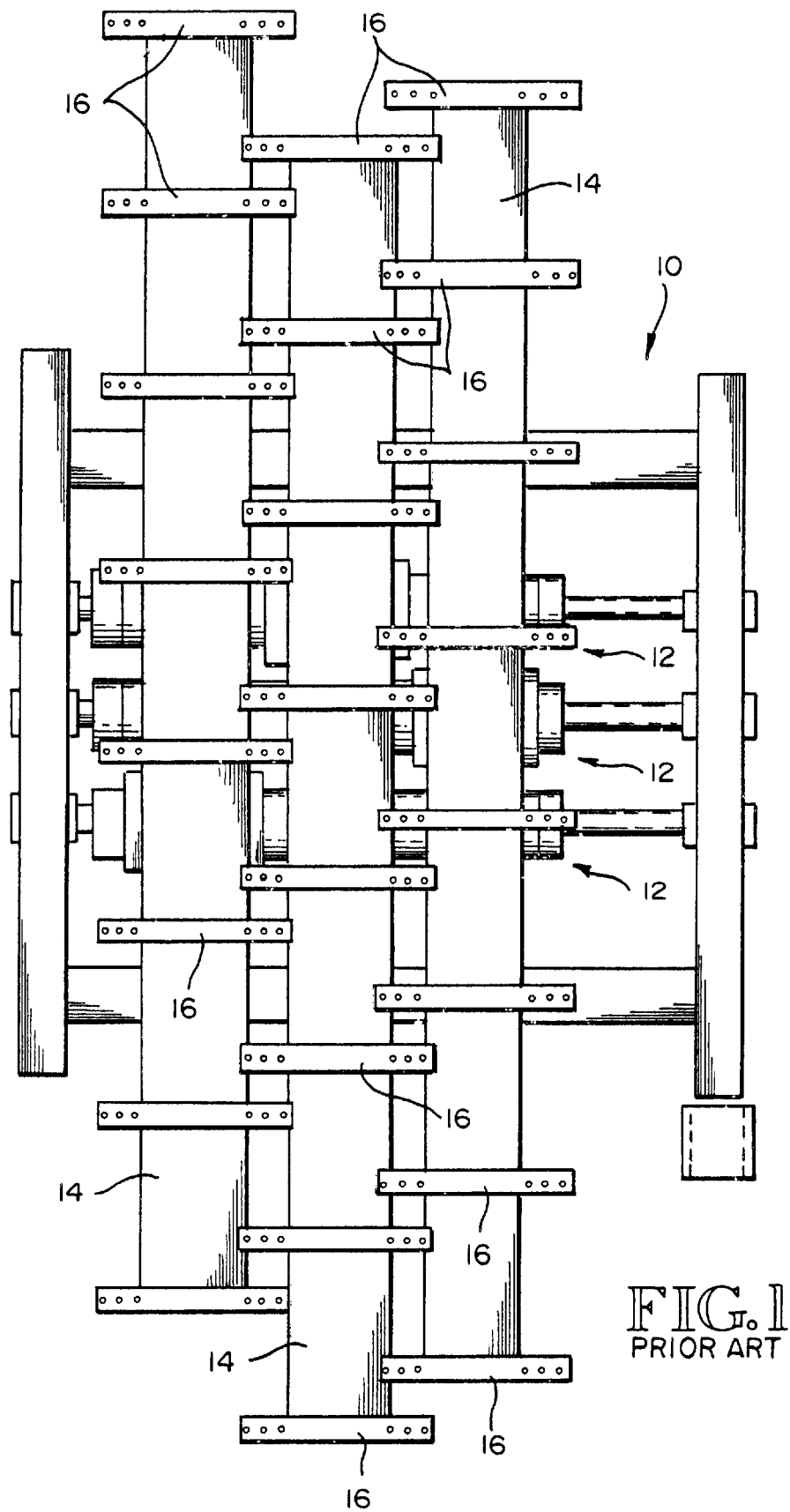
FIG. 1 is a top plan view of a prior art drive assembly for a reciprocating slat conveyor, such view showing transverse drive beams connected to hydraulic drive units and connectors on the drive beams that fit up into conveyor slats and to which the conveyor slats are connected by screw fasteners that extend downwardly through openings in the tops of the conveyor slats.
Figure 2:
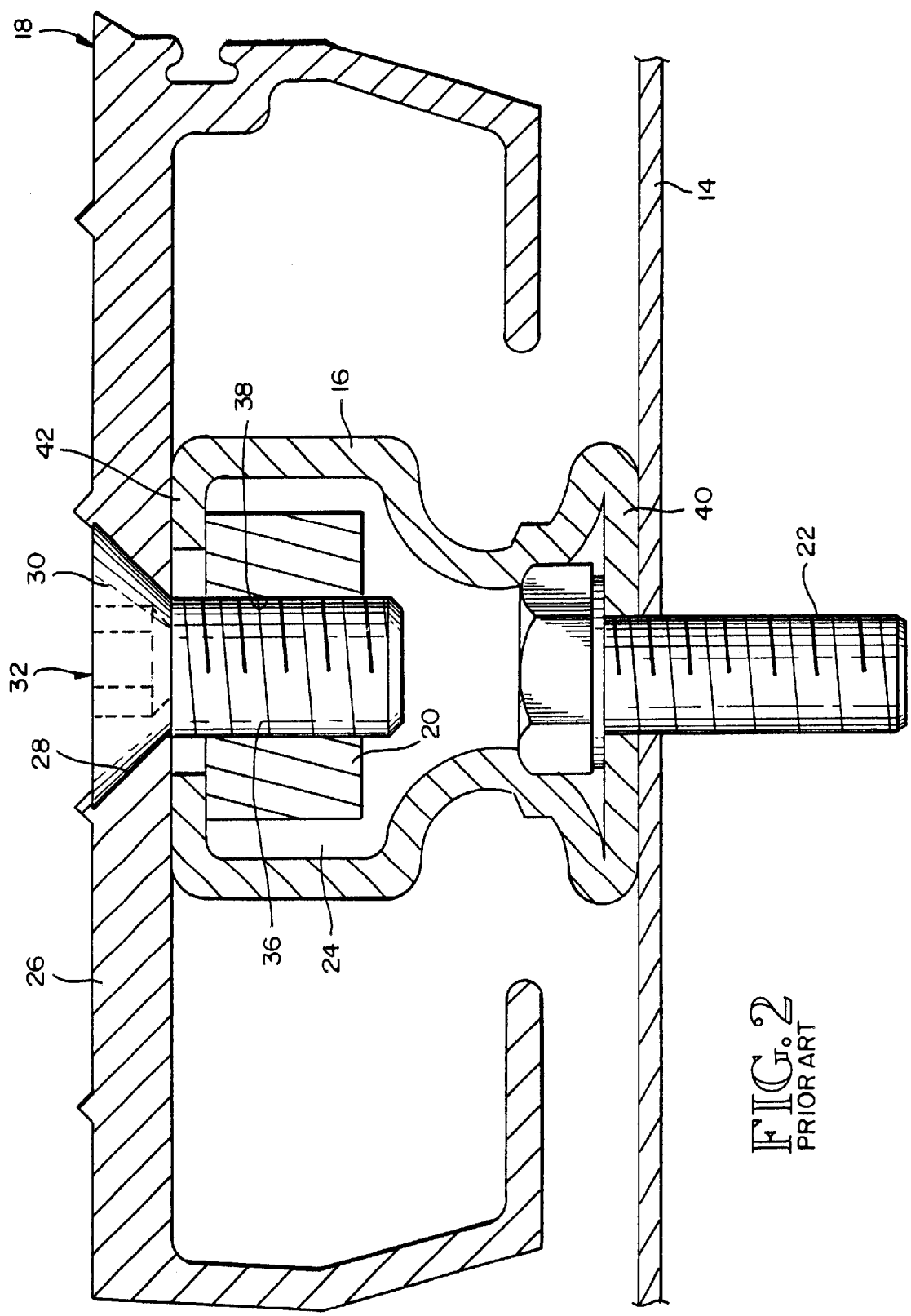
FIG. 2 is an enlarged scale cross sectional view through a conveyor slat where it is connected to a prior art connector.

FIG. 1 shows a prior art drive assembly for a typical reciprocating slat conveyor, one that comprises twenty-four conveyor slats. It includes three sets of conveyor slats and each set is connected to a different transverse drive beam. According to the present invention, the screw fasteners that have been used in prior art conveyors are eliminated and clamp structures that clamp onto bottom flange portions of the conveyor slats are used in their place.

FIG. 1 shows twenty-four connectors 16, eight on each of the three drive beams 14. The present invention replaces each prior art connector 16 with a new and unique connector 50. Each connector 50 is basically characterized by upper and lower clamp members 52, 54. FIGS. 3-6 show a fragmentary end portion of a transverse drive beam 56 (any of 14) shown with three connectors 50. By way of typical and therefore non-limitive example, a complete drive beam 56 may have eight connectors 50, the same as what is shown in FIG. 1 with respect to the prior art conveyor.

Figure 3:
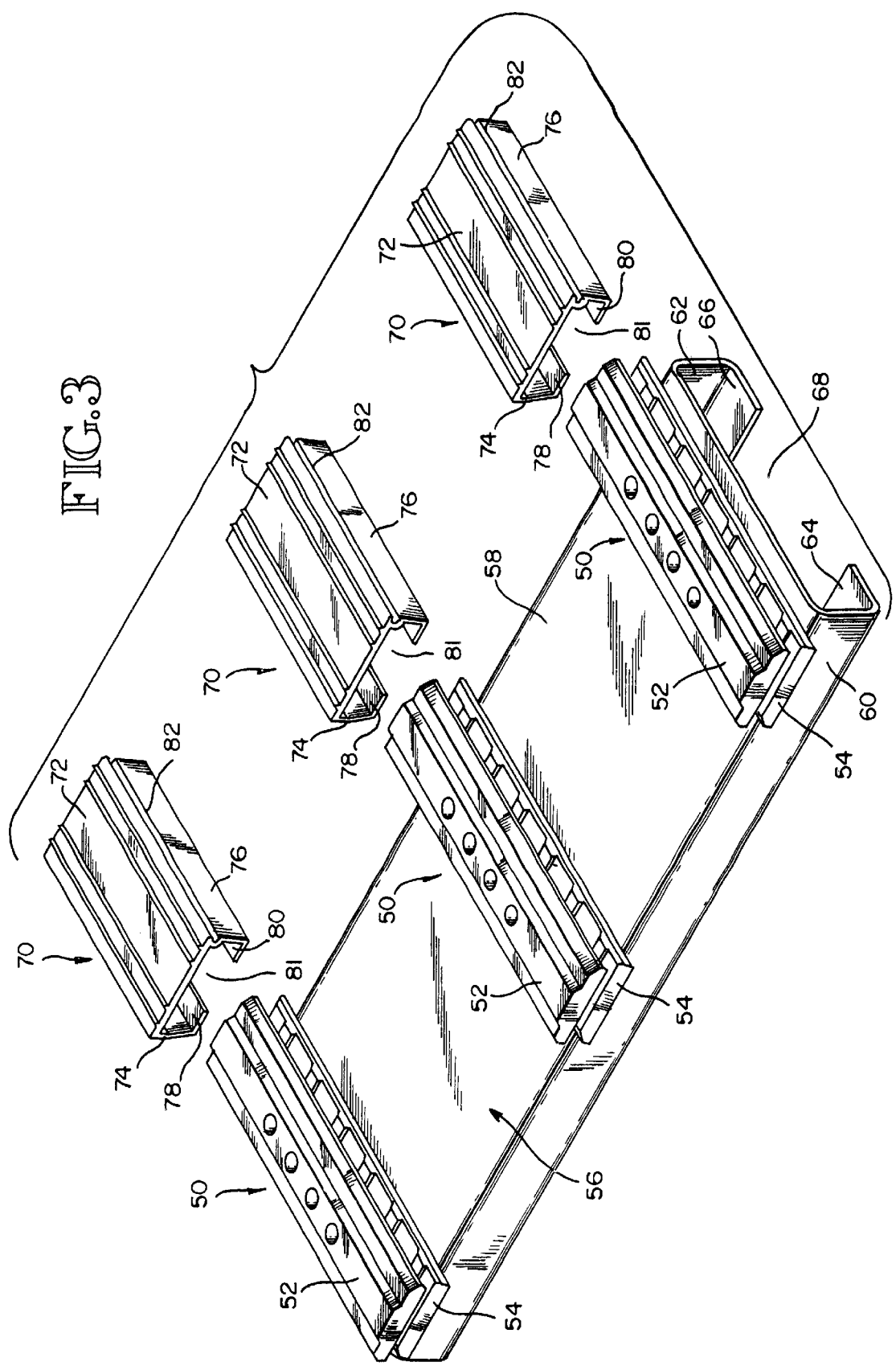
FIG. 3 is a fragmentary pictorial view of an end portion of a transverse drive beam showing three clamp assemblies of the present invention, such view including fragmentary end pieces of conveyor slats that are associated with the clamp assemblies, and such view being taken from above and looking towards one side and one end of the drive beam.
Figure 4:
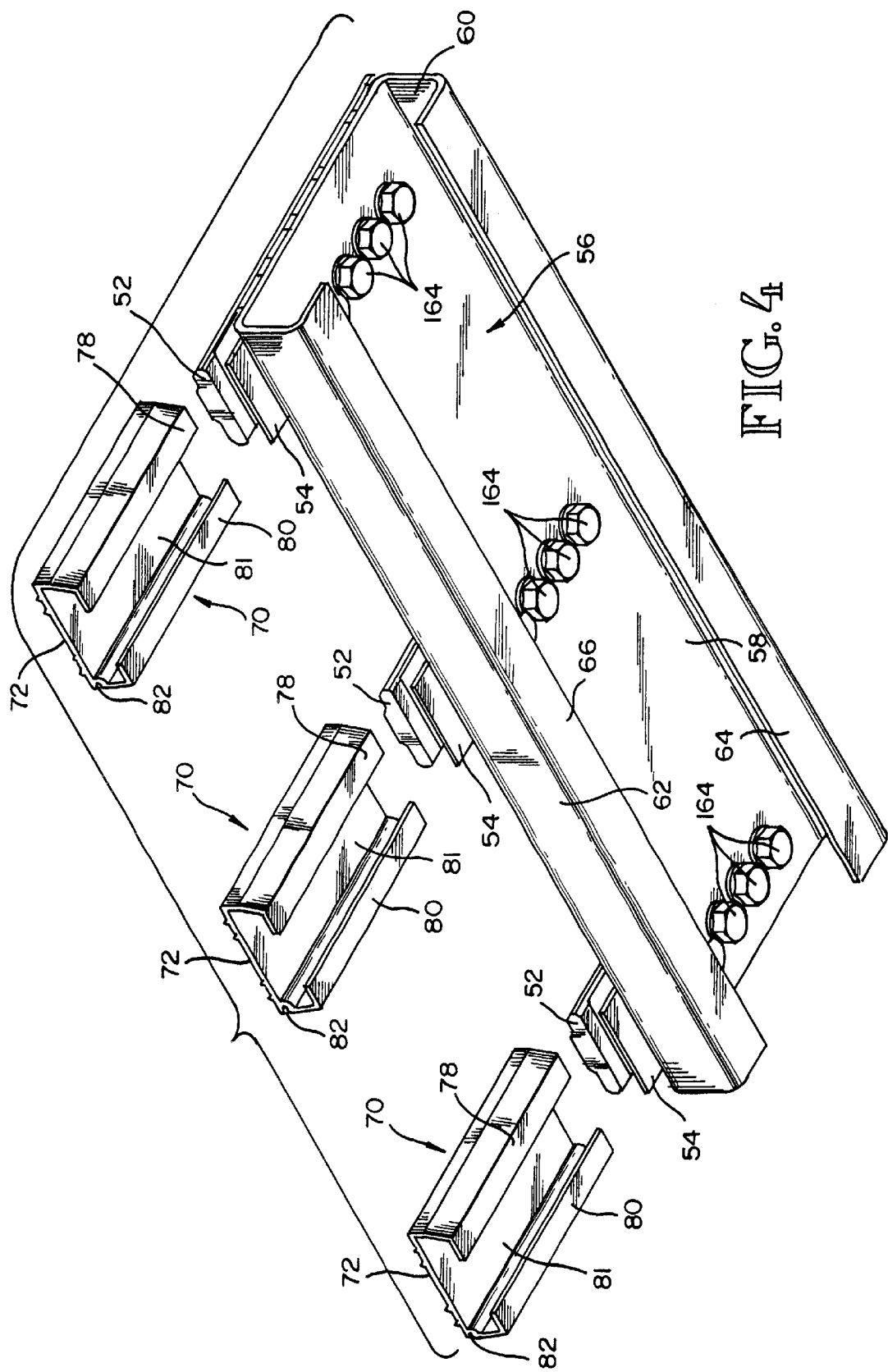
FIG. 4 is a fragmentary pictorial view of the drive beam and conveyor slat segment shown by FIG. 3, such view being taken from below and looking towards the bottom, the same end and the opposite side of the drive beam fragment that is shown by FIG. 3.
Figure 5:
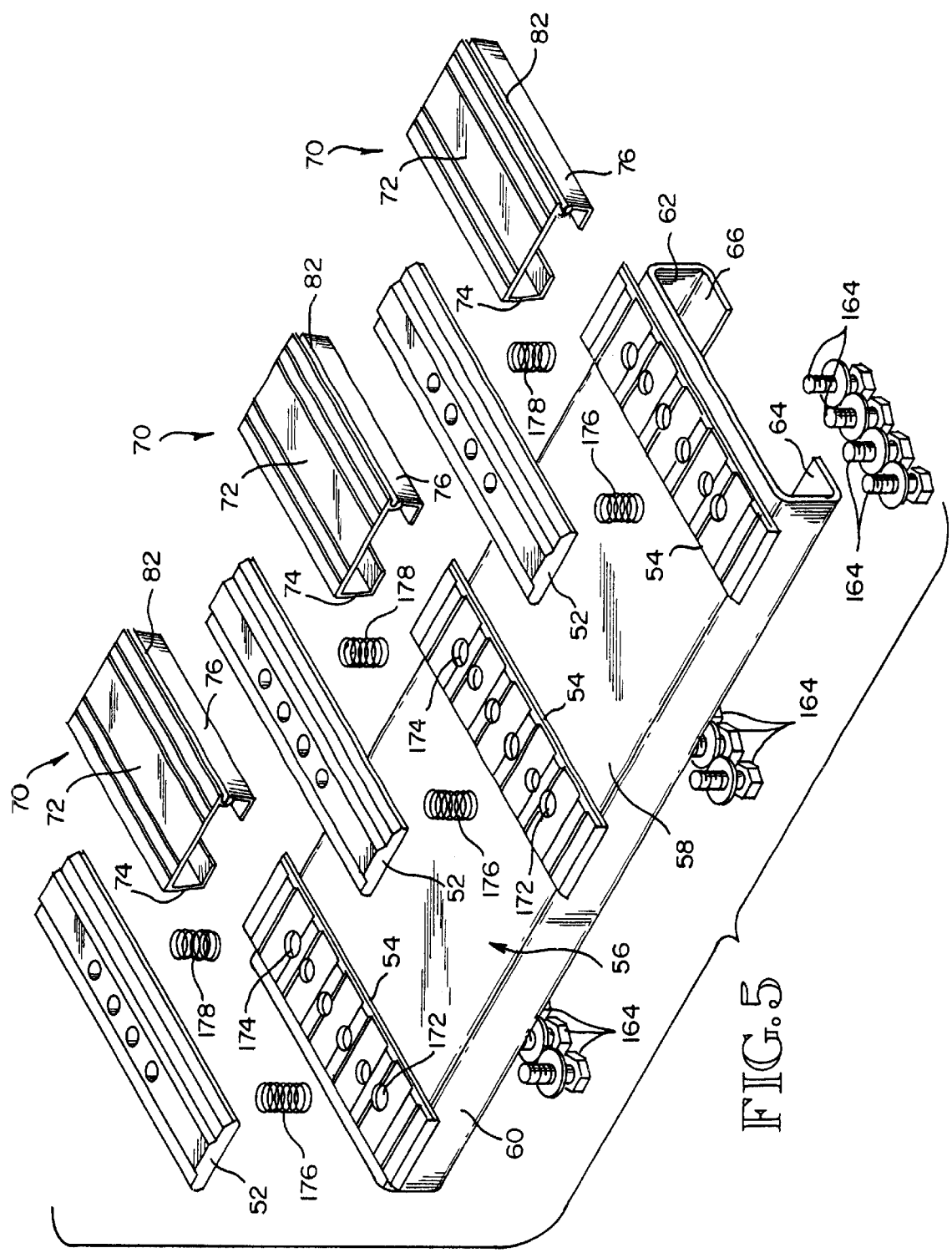
FIG. 5 is a view like FIG. 3 but showing the clamp assemblies exploded apart.
Figure 6:
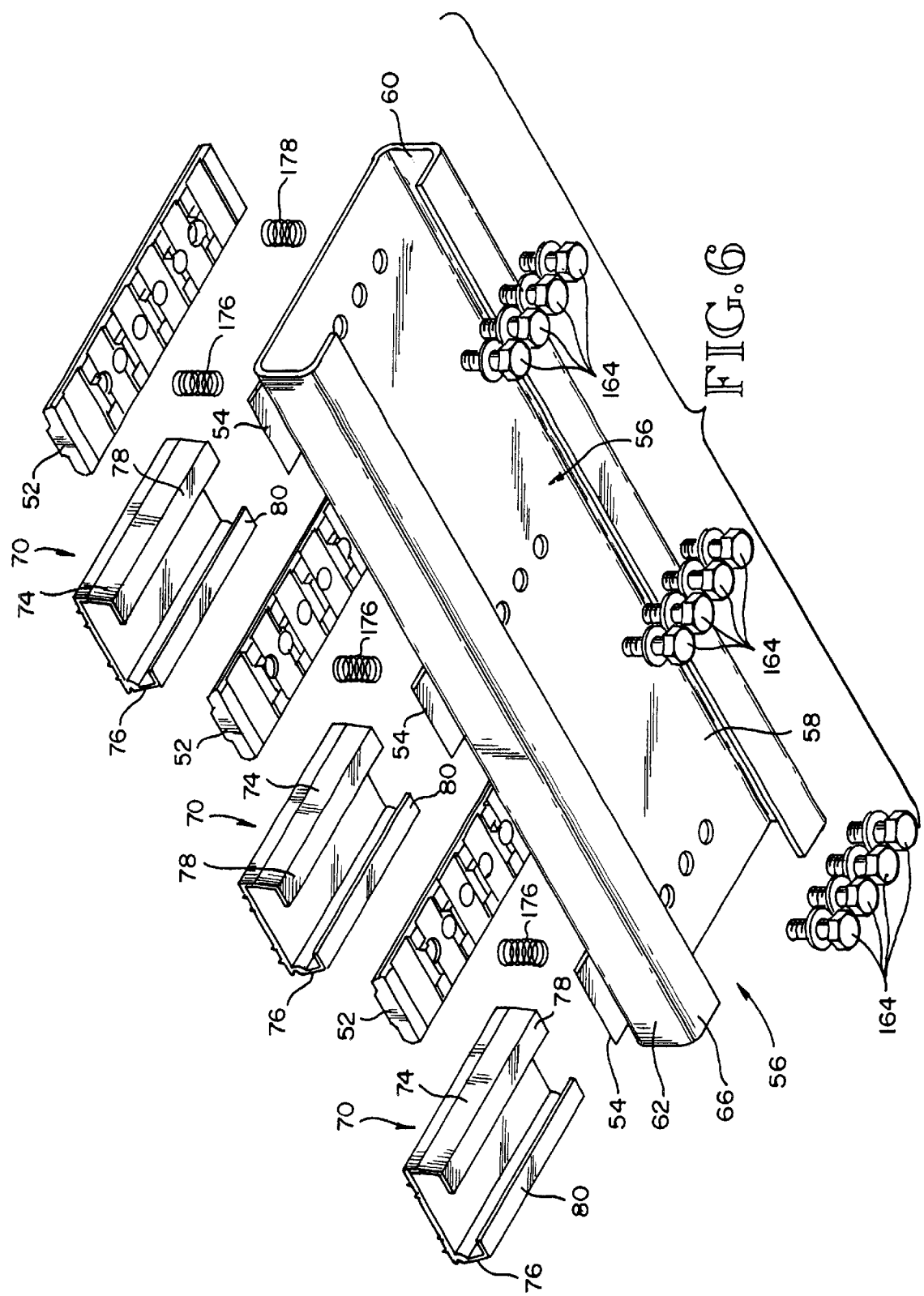
FIG. 6 is a view like FIG. 4 but showing the clamp assemblies exploded apart.

Drive beam 56 is preferably in the form of a flanged channel. It may be an extrusion and may have a top 58, a pair of sides 60, 62 and a pair of bottom flanges 64, 66. Space 68 between the bottom flanges 64, 66 provides access to the lower side of top 58. FIGS. 3 and 4 show the connectors 50 connected to the drive beam fragment 56. As clearly shown by FIGS. 5 and 6, the upper clamp parts 52 are removable and the lower clamp parts 54 are fixed to the top panel 58 of the drive beam 56. Preferably, the bottom clamp parts 54 are welded to the top 58 of the drive beam 56. The clamp members 52, 54 are elongated in the length direction of the conveyor slats, and are spaced apart laterally on the drive beam 66. Thus, clamp members 52, 54 extend longitudinally of the conveyor slats and transversely of the drive beams.

The conveyor slats 70 each comprises a top 72, a pair of laterally spaced apart side parts 74, 76 and a pair of bottom flanges 78, 80. The bottom flanges 78, 80 are in coplanar parallelism with each other and are in the spaced parallelism with the top 72. The top 72, the side parts 74, 76 and the bottom flanges 78, 80 together define an inner space 82 in the slat 70. Specifically, the inner space 81 is defined horizontally between side parts 74, 76 and vertically between top 72 and bottom flanges 78, 80. As is well known in the art, each conveyor slat 70 may also be formed to include a seal strip receiving groove 82. By way of typical and therefore non limitive example, the seal strip (not shown) may be like any of the seal strips that are mentioned in or disclosed by U.S. Pat. No. 5,655,645, granted Aug. 12, 1997, and entitled Seal Member For Reciprocating Slat Conveyor.

Figure 7:
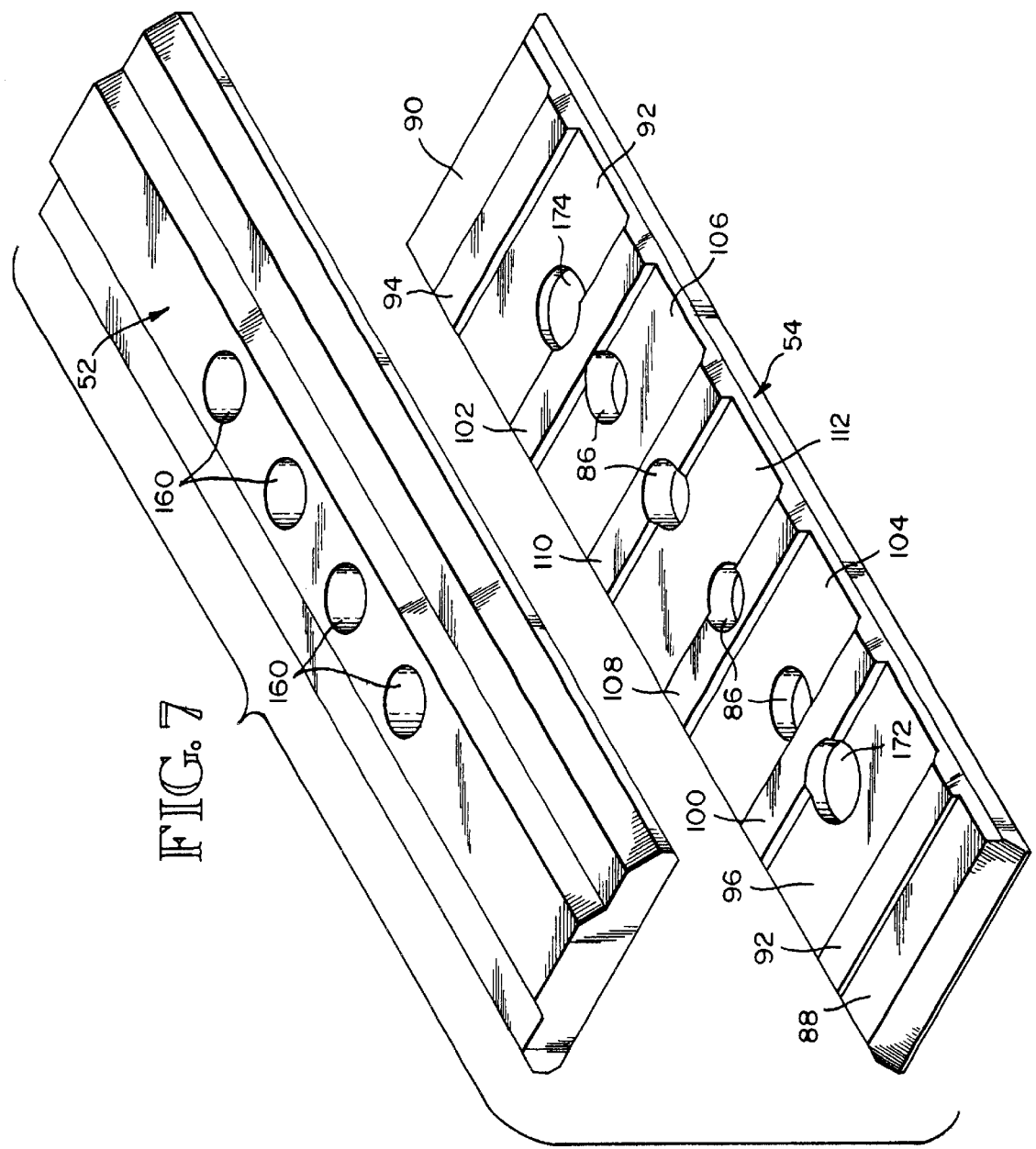
FIG. 7 is an enlarged scale pictorial view of upper and lower clamp members of a clamp assembly, such view being taken from above and looking towards the tops and a common side and a common end of both clamp members.
Figure 8:
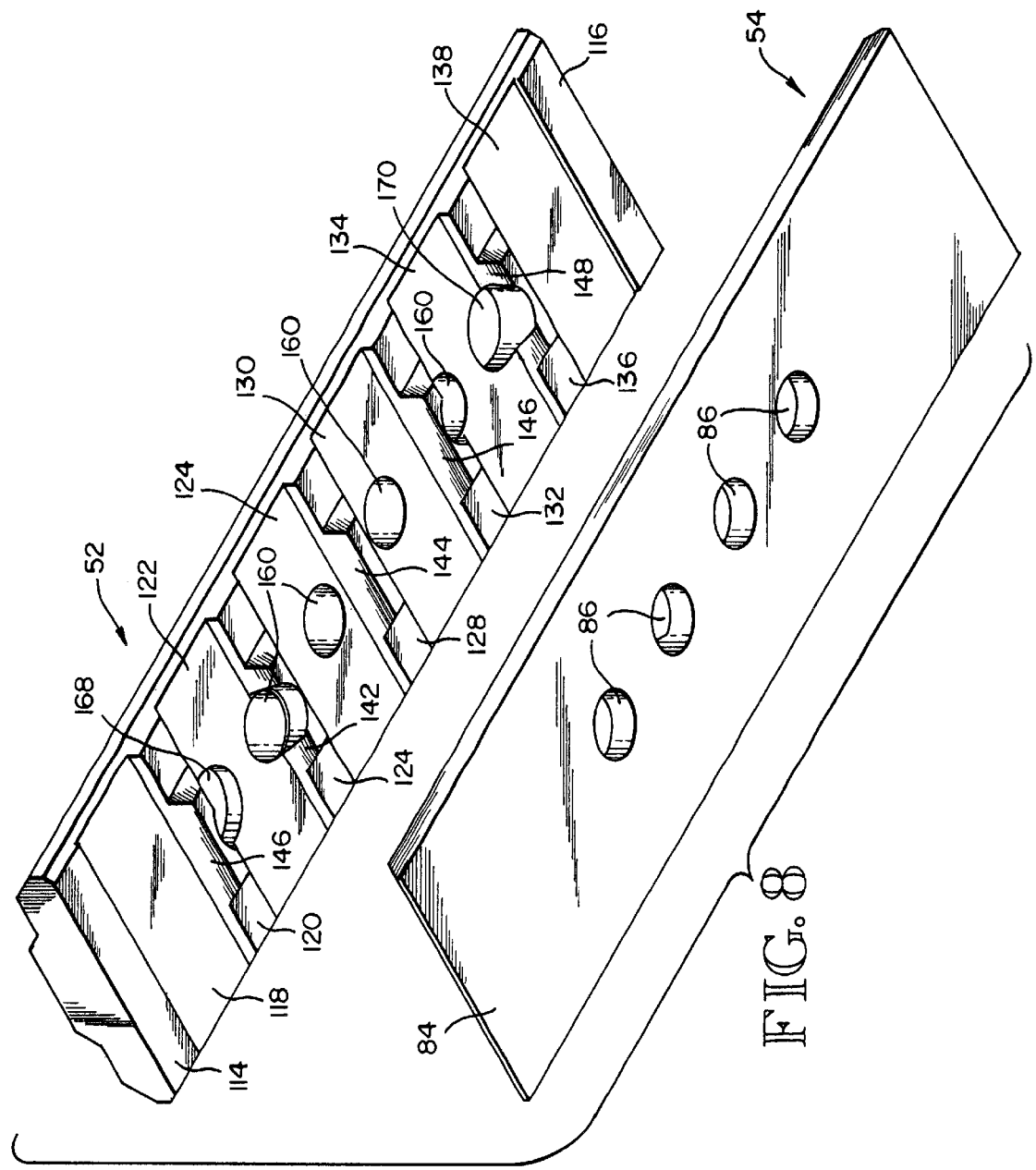
FIG. 8 is also an exploded pictorial view of the two clamp members shown in FIG. 7, such view looking towards the bottoms and the same sides and ends as are shown in FIG. 7.

Referring to FIGS. 7 and 8, the lower clamp member 54 is shown to be rectangular in plan form and to have a flat bottom 84 (FIG. 8). It also includes a plurality, e.g. four, through openings 86, extending between its bottom 84 and top. Referring to FIG. 7, the bottom clamp member 54 is shown to include a pair of end parts 88, 90, one at each of its ends. The end parts 88, 90 have planar upper clamp surfaces, at least where they extend below the bottom flanges 78, 80 of the conveyor slat 70. Longitudinally inwardly of the end parts 88, 90 are a first pair of projections 92, 94. Immediately longitudinally inwardly of the projections 92, 94 are first recesses 96, 98. Then, there are another pair of projections 100, 102 followed by another pair of recesses 104, 106. In the illustrated embodiment, there are two more projections 108, 110 and one more recess 112. Thus, from left to right, the upper surface of the bottom clamp member has an end part 88, then a projection 92, then a recess 96, then a projection 100, then a recess 104, then a projection 108, then a recess 112, then a projection 110, then a recess 106, then a projection 102, then a recess 98, then a projection 94 and finally a second end part 90. Preferably, the upper surfaces of the projections 92, 100, 108, 110, 102, 94 and the upper surfaces of the recesses 96, 104, 112, 106, 98 are planar or flat. Also, they may extend uniformly across the width of the lower clamp member 54. As also shown by FIG. 9, the upper clamp member 52 preferably includes end parts 114, 116 which have planar lower surfaces that extend from side to side of the clamp part 52.

Figure 9:
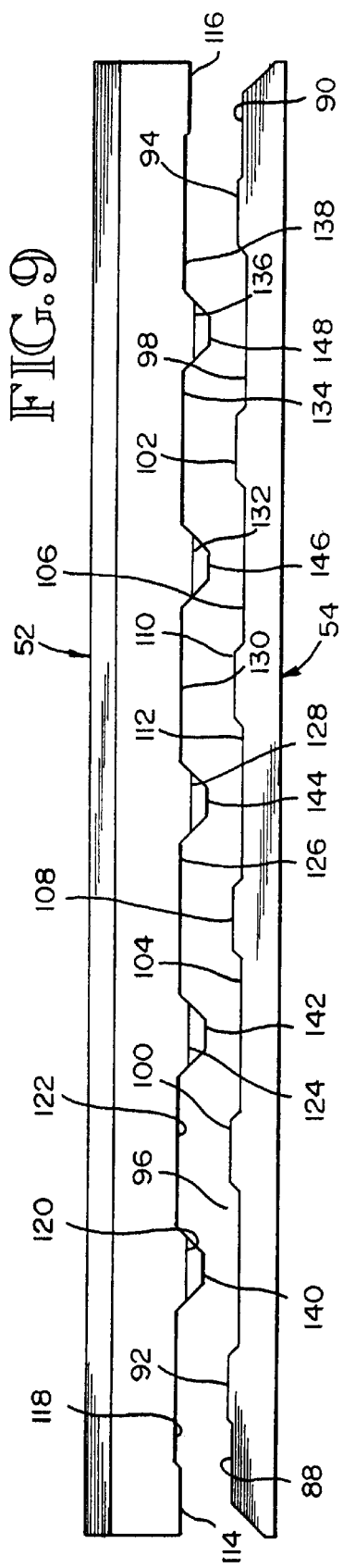
FIG. 9 is a side elevational view showing the upper clamp member spaced above the lower clamp member.

Starting from the left end of clamp member 52 as it is shown in FIG. 9, longitudinally inwardly of end part 114 there is a recess 118. Next, there is a projection 120 followed by a recess 122. Recess 122 is followed by a projection 124 and it is followed by a recess 126. Recess 126 is followed by a projection 128 and it in turn is followed by a recess 130. Recess 130 is followed by a projection 132 that is followed by a recess 134. Next, there is a projection 136 and it is followed by a recess 138. The bottom surfaces of the recesses 118, 122, 126, 130, 134, 138 are preferably flat and they preferably extend the full width of the clamp member 52. The center portions of the projections 120, 124, 128, 132, 136 each include an additional projection 140, 142, 144, 146, 148. These additional projections are best shown by FIG. 8 and are herein sometimes referred to as "stops". They extend downwardly from the projections 120, 124, 128, 132, 136 in the central region of the clamp member 52 that lies between the conveyor slat bottom flanges 78, 80. This is clearly shown by FIG. 14. The bottom surfaces of the projections 120, 124, 128, 132, 138 that are endwise outwardly of the additional projections 140, 142, 144, 146, 148 are substantially coplanar. As shown by FIG. 9, they are in a plane that is below the plane in which the bottom surfaces of the end parts 114, 116 are situated. The bottom surfaces of the recesses 118, 122, 126, 130, 134, 138 are also substantially coplanar. They are all in a plane that is slightly above the plane of the bottom surfaces of the end parts 114, 116.

As also shown by FIG. 9, the upper clamp surfaces of the end parts 88, 90 are substantially coplanar. The upper surfaces of the recesses 96, 104, 112, 106, 98 are also substantially coplanar. They are in a plane that is below the plane of the upper surfaces of the end parts 88, 90. The upper surfaces of the projections 92, 100, 108, 110, 102, 94 are also substantially coplanar. They lie in a plane that is above the plane that includes the upper surfaces of the end parts 88, 90. As also shown by FIG. 9, each projection of each clamp member is aligned with a central portion of a recess of the other clamp member. Projections 92, 100, 108, 110, 102, 94 of clamp member 54 are aligned with central portions of recesses 118, 122, 126, 130, 134, 138, respectively. Also, the projections 120, 124, 128, 132, 136 on clamp member 52 are aligned with central portions of the recesses 96, 104, 112, 106, 98, respectively that are formed in the lower clamp member 54.

When the two clamp members 52, 54 are moved together until the stops 140, 142, 144, 146, 148 contact the lower clamp member 54, the upper and lower surfaces 88, 114 and 90, 116 of the lower and upper clamp members 54, 52 are spaced apart a distance that is substantially equal to or thinner than the thickness of the conveyor slat bottom flanges 78, 80. Starting from one end of the clamp member pair 52, 54, there is the just described space between the two end parts at that end of the pair followed by an undulating space that is vertically between the side parts of the clamp member pair 52, 54. This continues until a space that is between the end parts at the opposite end of the clamp member pair 52, 54.

FIG. 11 shows a longitudinal section taken substantially along line 11—11 of FIG. 14, but with the conveyor slat and the drive beam omitted. FIG. 12 includes broken line showings of the stops and shows the upper clamp member 52 moved towards the lower clamp member 54 until the stops are in contact with upper surface portions of the lower clamp member 54. This view best shows the undulating nature of the spaces in which the conveyor slat bottom flanges 78, 80 are received.

The upper clamp member 52 includes through openings 160 that are alignable with the through openings 86 in the lower clamp member 54. Whereas openings 86 are sized to freely pass the threaded shanks 162 of clamp bolts 164, the openings 160 are internally threaded with threads that match the external threads on the threaded bolt shanks 162.

Figure 20:
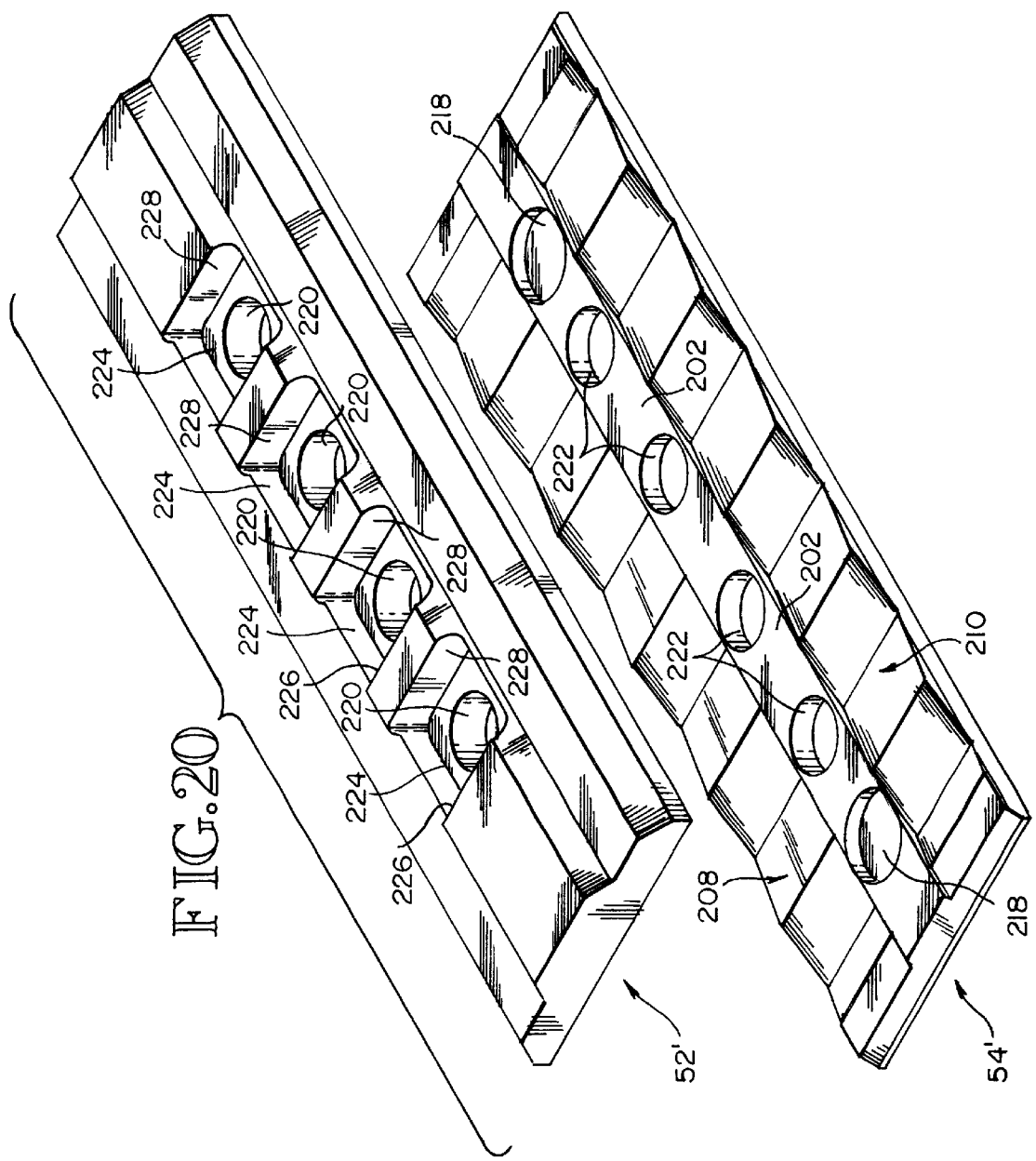
FIG. 20 is a view like FIG. 7 but of the connector components shown in FIGS. 18 and 19.

As clearly shown by FIGS. 8 and 20, the upper clamp member 52 also includes a pair of blind sockets 168, 170. The openings 160 and the sockets 168, 170 are in longitudinal alignment at the lateral center of clamp member 52. At best shown by FIGS. 7 and 10, the lower clamp member 54 also includes a pair of blond sockets 172, 174. These sockets 172, 174 are aligned with the openings 88 at the lateral center of the clamp member 54. Socket 168 is alignable with socket 172. In similar fashion, socket 170 is alignable with socket 174. The upper sockets 168, 170 are sized to receive the upper end portions of a pair of compression springs 176, 178. The lower sockets 172, 174 are sized to receive lower end portions of the same compression springs 176, 178. As can be seen from FIG. 14, the threaded shanks 162 of the bolts 164 can be inserted through the openings 86 in lower clamp member 54 and threaded into the threaded openings 168. The compression springs 176, 178 serve to urge upper clamp member 52 away from lower clamp member 54 while the bolts 164 secure them together. As shown by FIG. 14, vertical spaces are formed between the side portions of the clamp parts 52, 54 into which the conveyor slat bottom flanges 78, 80 can be moved. The bolts 164 and the stops 140, 142, 144, 146, 148 are in the space that is laterally between the conveyor slat bottom flanges 78, 80. When the upper clamp member 52 is positioned substantially as shown in FIG. 14, the conveyor slat 70 can be aligned with the upper clamp member 52 and the open spaces that are vertically between the side portions of the two clamp parts 52, 54 and the conveyor slat 70 can be then slid lengthwise until it is substantially in position for securement to its transverse drive beam, e.g. drive beam 56. It will be understood that seal strips will be in the seal strip grooves 82 at the time. When the conveyor slats 70 are installed on the conveyor frame and drive assembly except for their securement to the transverse drive beams 14, the conveyor slats 70 are individually slid lengthwise and sideways until they are probably space and positioned. Then, a workman reaches under the drive beam 56 and attaches a wrench to the bolt heads 166 and tightens the bolts 164 50 as to draw the upper clamp members 52 downwardly towards the lower clamp members 54. Tightening of the bolts 164 moves the clamp surfaces 114, 116 towards the conveyor bottom flanges 78, 80. The projections 120, 124, 128, 132, 136 re moved against upper surface portions of the conveyor slat bottom flanges 78, 80. As the upper clamp member 52 moves downwardly, the lower projections 92, 100, 108, 110, 102, 94 are moved relatively upwardly against bottom surface portions of the conveyor slat bottom flanges 78, 80. Further tightening of the bolts 164 causes the sections of the conveyor slat bottom flanges 78, 80 that are longitudinally between the clamp surfaces 114, 88 and 116, 98, causing it to assume an undulating shape such as shown in FIG. 13. Further tightening of the bolts 164 will first cause the portions of the conveyor slat bottom flanges 78, 80 that are immediately between the clamping surfaces 114, 80 at one end of the clap assembly and the surfaces 116, 90 at the opposite end, to clamp onto the conveyor slat bottom flanges 78, 80. The clamp surfaces 114, 88 and 116, 90 are parallel to the bottom flanges 78, 80. As the bolts 164 are tightened, clamping pressure at 114, 88 and 116, 90 will continue until the stops 140, 142, 144, 146, 148 make contact with the confronting surfaces of the recesses 96, 104, 112, 106, 98. Following this contact, the bolts 164 will be put into tension and there will be no further deformation of the conveyor slat bottom flanges by the combines action of the above described projections and recesses. Preferably, the projections and recesses are sized such that they will not put any sharp creases in the conveyor slat bottom flanges 78, 80 even though a substantial amount of clamping force will be developed at the needs of the clamp members 52, 54, where the clamp surfaces 114, 88 and 116, 90 grip onto the conveyor slat bottom flanges 78, 80.

Figure 10:
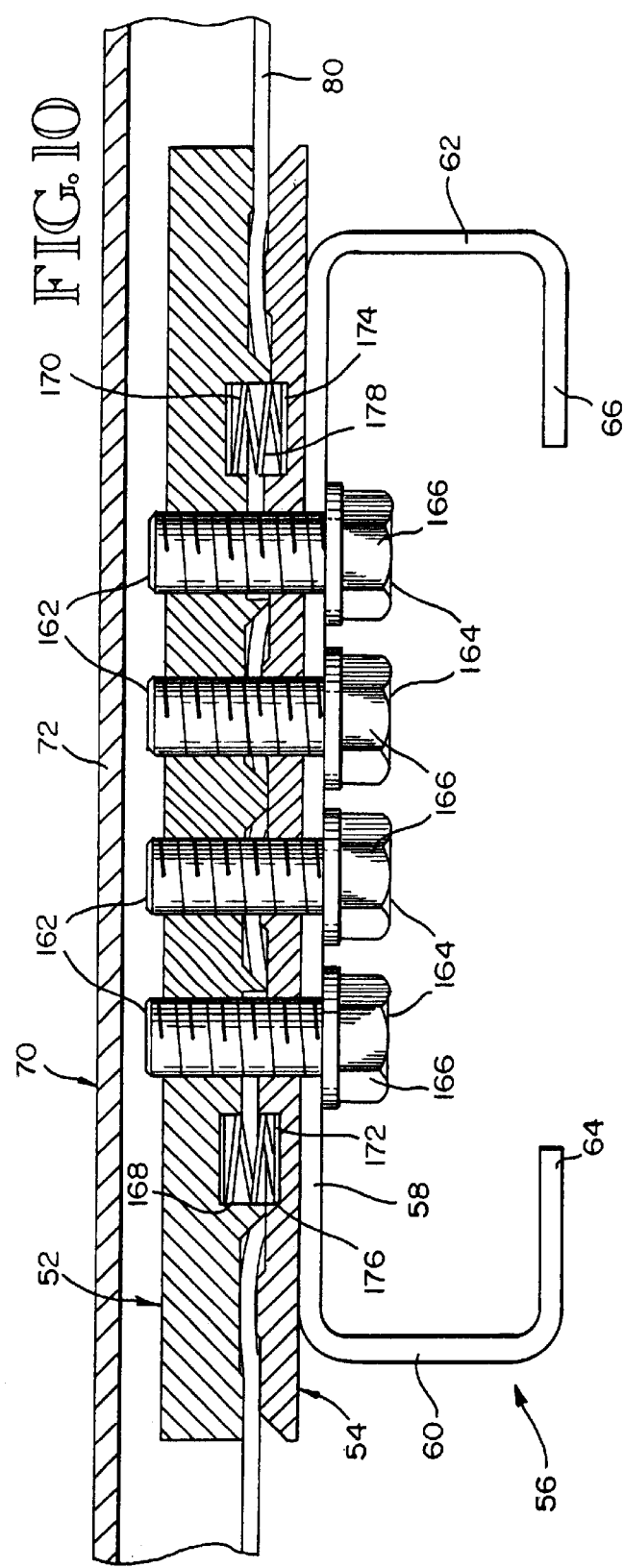
FIG. 10 is a cross sectional view through the transverse drive beam and a longitudinal view through a conveyor slat and the clamp assembly used to connect it to the drive beam, such view showing the clamp bolts tightened and showing the clamp members gripping one of the conveyor slat flanges.

As can be seen from FIG. 10, the tightening of the bolts 164 causes the springs 176, 178 to be compressed as the upper clamp member 52 is drawn towards the lower clamp member 54.

It is to be understood that the pattern of the confronting surfaces on the clamp members 52, 54 can vary substantially. The construction that has been illustrated and described is a preferred construction but the invention is not limited to this construction of the clamp surfaces.

FIGS. 16 and 17 show a modified embodiment of the invention. In FIG. 16, the clamp bolts are designated 190. They are shown to project downwardly from the upper clamp members 52. They may be studs that are anchored at their upper ends to the clamp members 52. Or, they may be bolts that extend downwardly through the clamp members 52 from heads (not shown) at their upper ends that are within countersinks in upper regions of the upper clamp members 52. In any event, each upper clamp member 52 is positioned within its conveyor slat 70, with its bolts 190 projecting downwardly through the space between the conveyor slat bottom flanges 78, 80. The threaded shanks of the bolts 190 project downwardly through openings in the lower clamp members 54 and openings 194 in the transverse drive beam 56. The bolt shanks first receive lock washers 196 and then the nuts 192. The nuts 192 are threaded onto the threaded shanks of the bolts 190, so as to draw the upper clamp members 52 downwardly towards the lower clamp members 54 and clamp the conveyor slat bottom flanges 78, 80 between the side portions of the clamp members 52, 54. This arrangement of the bolts makes it possible to use a snap-on bearing of the type shown by my U.S. Pat. No. 4,785,929, granted Nov. 22, 1988, and entitled "Bearing System For Reciprocating Floor Conveyors". The contents of this patent is hereby incorporated herein by this specific reference. This patent shows how the bearings are constructed, are installed on support and guide beams 178 and how the conveyor slats are snap fitted onto the bearings. When the FIG. 16 embodiment is used, the upper clamp members 52 are positioned within the conveyor slats 70. The compression springs 176, 178 are positioned in the sockets 172, 174. Then the conveyor slats 70 are positioned over the bearings B and the bolts 190 are aligned with the openings in the lower clamp members 54 and the openings 194 in the drive beam 56. Then, the slats 70 are snapped down onto the bearings B (FIG. 17) in the manner described in the aforementioned U.S. Pat. No. 4,785,929. Once the conveyor slats 70 are installed, the lock nuts 196 and the bolts 192 are installed and are tightened to draw the two clamp members 52, 54 together and into clamping engagement with the conveyor slat bottom flanges 78, 80, in the manner described above.

FIGS. 18-26 disclose an embodiment of the invention in which the upper and lower clamp members 52', 54' are formed to each include central regions 200, 202 (FIGS. 20-23) and clamp portions 204, 206 and 208, 210. Clamp portions 204, 206 are on the opposite sides of central region 200. Clamp portions 208, 210 are on the opposite sides of central region 202. Each of the clamp portions 204, 206, 208, 210 is formed to include alternating peak and valley regions 212, 214. As best shown in FIG. 23, when upper clamp part 52' is set down onto lower clamp part 54', the center regions 200, 202 touch and there is a vertical space between side regions 204, 210 and 206, 208.

Figure 18:
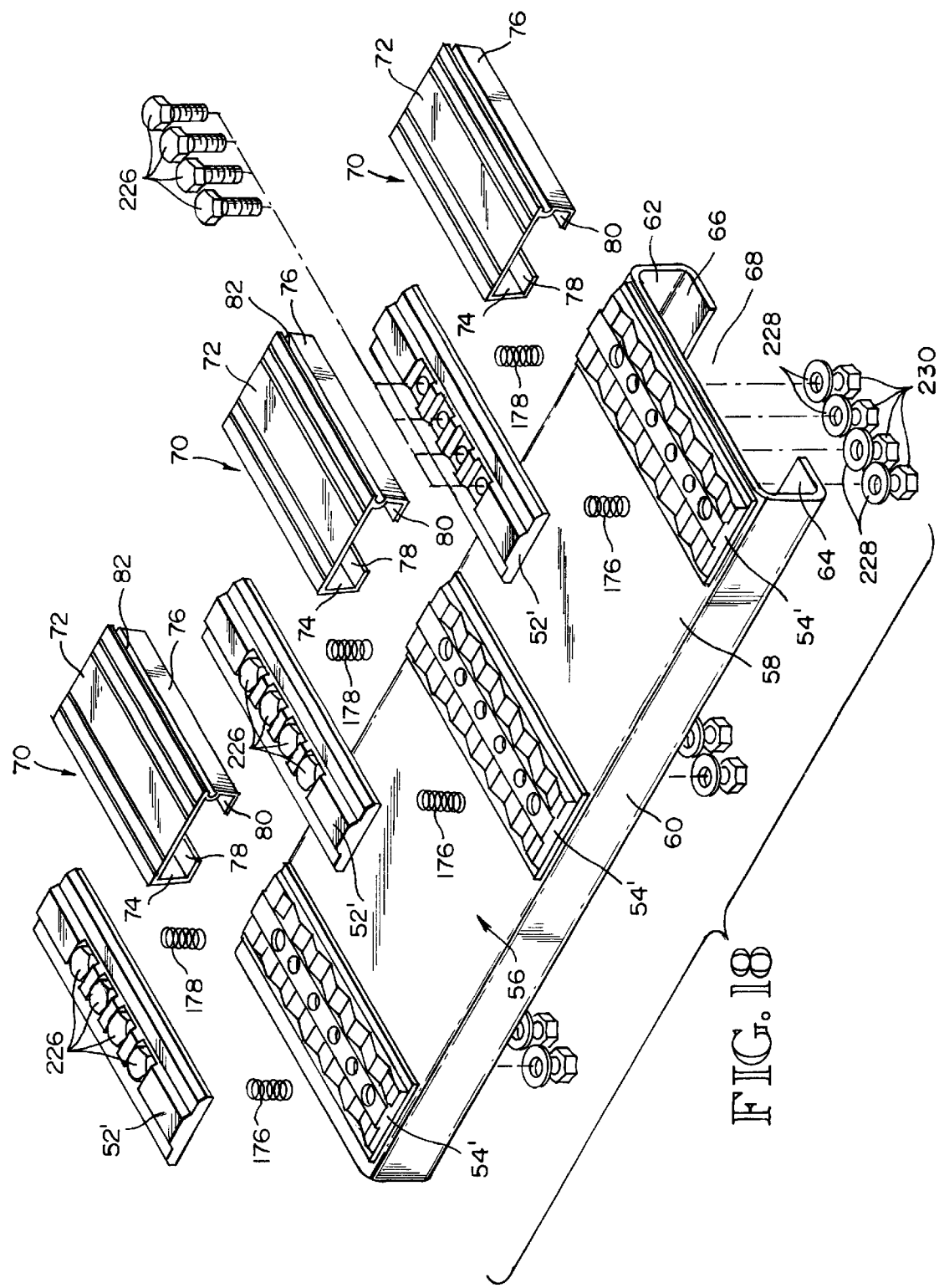
FIG. 18 is a pictorial view like FIG. 5 but of a second embodiment of the invention.
Figure 19:
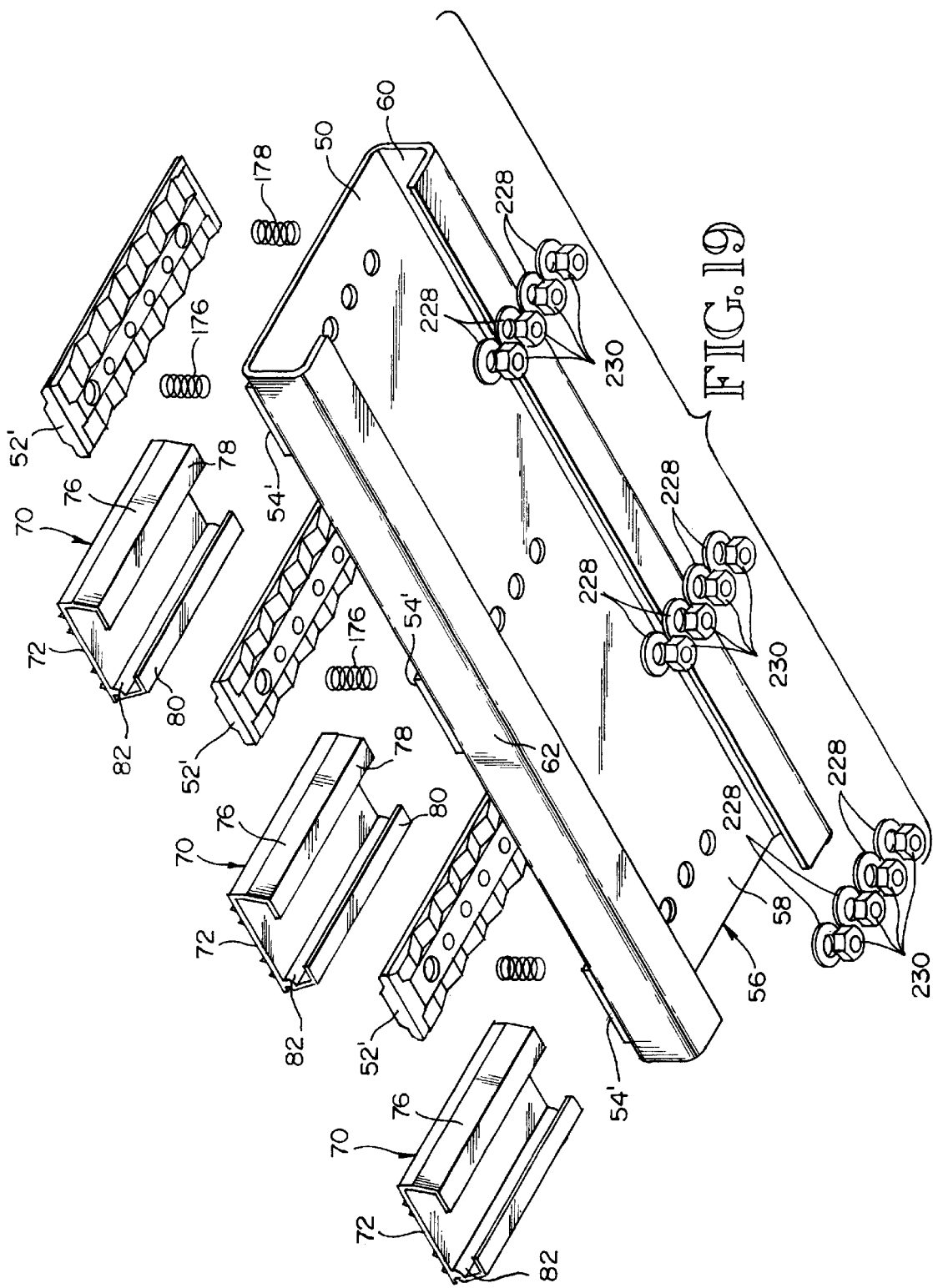
FIG. 19 is a pictorial view like FIG. 6 but of the embodiment of the invention shown by FIG. 18.

The clamp parts 52', 54' may include spring sockets 216, 218 sized to receive end portions of the springs 176, 178. The clamp parts 52', 54' include bolt-receiving openings 216, 218. As best shown by FIG. 20, the upper clamp part 52 includes bolt head receiving sockets 224. The sockets have opposed wrench surfaces 226, 228 that are spaced apart a distance substantially equal to or slightly greater than the distance between a pair of opposite slats on a bolt head. In this embodiment, the bolts 226 are inserted downwardly through the openings 220, 222 in the clamp members 52', 54'. The bolt heads are moved into the sockets 224, as shown in FIG. 18. Washers 228 and nuts 230 are installed onto the threaded lower end portions of the bolts 226 below the top panel 58 of the transverse drive beam 56.

When the bolt, washer and nut assemblies 226, 228, 230 are assembled, and the nuts 230 are tightened on the bolts 226, the upper clamp member 52' is moved downwardly towards the lower clamp member 54'. If this is done without a floor member flange between the side regions of the clamp parts 52', 54', clamp part 52' will move downwardly until its center region 200 contacts the center region 202 on the lower clamp part 54'. When contact is made, the side portions 204, 206 of the upper clamp member 52' are spaced upwardly from the side portions 208, 210 of the lower clamp portion 54'. This provides a zigzag path at each side of the clamp assembly, between the upper and lower clamp surfaces, as shown by FIG. 23. In use, the lower flanges 78, 80 of the floor slat members 70 are positioned vertically between the side located clamp parts 204, 210 and 206, 208 (FIG. 25) and then the bolt, washer and nut combinations 226, 228, 230 are tightened. This presses the undulating clamp surfaces against the upper and lower surfaces of the conveyor slat flanges 78, 80 and bends them to make them take on the zigzag shape of the spaces between the upper and lower clamp surfaces 204, 210, 206, 208 (FIG. 26).

As best shown by FIGS. 21 and 22, some of the undulating clamp surfaces that form the peaks and valleys 112, 114 are designated 240, 242, 244, 246, 248, 250 on the upper clamp member 52'. On the lower clamp member 54' they are designated 252, 254, 256, 258, 260, 262. When the bolt, washer and nut assemblies 226, 228, 230 are tightened, the floor member flanges 78, 80 are clamped between the clamp members 52', 54' in very much the same way as these flanges are clamped in the first embodiment.

FIGS. 27 and 28 show an embodiment of the invention in which the lower clamp member or part 54" is a formed region of the upper panel 58' of the transverse drive beam 56'. By way of example, a rectangular piece of plate material can be provided that has the desired length of a transverse drive beam and a width equal to the combined width of the top panel 58', the sidewalls 60', 62' and the bottom flanges 64', 66'. This piece of plate material may then be placed between upper and lower stamping jaws that when brought together will form at least location of a clamp assembly the lower clamp part or member 54". The upper stamped jaw will move metal downwardly to form the valley regions and a lower stamp jaw will push metal upwardly to form the peak regions. In this embodiment, an adapter plate 270 is positioned between each lower clamp part 54'. Adapter plate 270 has an undulating upper surface that substantially matches the undulating lower surface of the lower clamp region 54". Adapter plate 270 also includes a preferably flat lower surface 272 against which the washers 228 bear. The upper clamp member 52" may include bolt head (or nut) sockets, such as shown in FIG. 20, for example, or it may include one longitudinally extending channel 274. In the latter case, the longitudinal sidewalls 276, 278 provide the wrench surfaces. They are spaced apart a distance substantially equal to or slightly greater than the distance between two opposite slats on the bolt heads 226 (or nut). The sockets 224 in the channel 274 hold either the bolt head 226 or the nuts 230 while the nuts 230 or bolts 226 are being rotated from below the panel 58', for attaching the nuts 230 to the threaded shanks of the bolts 226.

In FIG. 27, the bolts 226 are on the top. The threaded shanks of the bolts extend downwardly through openings 280 in the upper clamp member 52", then through openings 282 in the lower clamp member 54', then through openings 284 in the plate 272. Below plate 272, the washers 228 are installed and then the nuts 230 are screwed on to the threaded lower end portions of the bolts 226. If the nuts 230 are placed in the sockets 224 or the channel 274, they must in some way be trapped and maintained in alignment with the openings 280.

After the clamp regions 54" are stamped formed into the plate material, the plate material is further formed to provide the sidewalls 60', 62' and the bottom flanges 64', 66'. A modified way of forming the transverse drive beams 56' would be to bend the plate material to form the sidewalls 60', 62' and the bottom flanges 64', 66', and then the lower clamp regions 54" are stamped formed into the upper panel 58'.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the we following claims, interpreted according to accepted doctrines of claim interpretation, including use of the doctrine of equivalents and reversal of parts.

What is claimed is:

1. Apparatus for connecting a reciprocating conveyor slat having an inner space and laterally spaced apart bottom flanges, to a drive beam that is situated below the bottom flanges, said apparatus comprising:

an upper clamp member fitable into the inner space of the conveyor slat and having side portions positionable above the bottom flanges;

a lower clamp member connected to the drive beam and having side portions below the bottom flanges; and at least one bolt having a head and a threaded shank, said bolt being insertable upwardly through openings in the drive beam and the lower clamp member and being threadable into a threaded opening in the upper clamp member, whereby said bolt can be tightened to pull the upper clamp member downwardly and firmly clamp the bottom flanges of the conveyor slat between the side portions of the upper and lower clamp members, allowing the conveyor slat to be connected to the drive beam without the use of fastener holes in the top of the conveyor slat.

2. The apparatus of claim 1, wherein the bolt is laterally between the bottom flanges of the conveyor slat.

3. The apparatus of claim 2, comprising at least one spring vertically between the upper and lower clamp members that is of a size and strength sufficient to urge the upper clamp member away from the lower clamp member when the bolt is loosened, so as to define vertical spaces between the side portions of the upper and lower clamp parts into which the bottom flanges of the conveyor slat can be moved.

4. The apparatus of claim 3, comprising a downwardly directed upper socket in the upper clamp member and an upwardly directed lower socket in the lower clamp member, and said spring having an upper end portion in the upper socket and a lower end portion in the lower socket.

5. The apparatus of claim 1, comprising a plurality of bolts spaced apart longitudinally of the conveyor slat, each said bolt being insertable upwardly through openings in the drive beam and the lower clamp member and being threadable into a threaded opening in the upper clamp member.

6. The apparatus of claim 5, wherein said bolts are laterally between the bottom flanges of the conveyor slat.

7. The apparatus of claim 6, comprising at least two springs spaced apart longitudinally of the conveyor slat and positioned vertically between the upper and lower clamp members, said springs each being of a size and strength sufficient to urge the upper clamp member away from the lower clamp member where the bolt is loosened, so as to define spaces vertically between the side portions of the upper and lower clamp parts for receiving the bottom flanges of the conveyor slat.

8. Apparatus for connecting a reciprocating conveyor slat having an inner space and laterally spaced apart bottom flanges, to a drive beam that is situated below the bottom flanges, said apparatus comprising:

an elongated upper clamp member fitable into the inner space of the conveyor and having side portions positionable above the bottom flanges;

an elongated lower clamp member connected to the drive beam and having side portions below the bottom flanges; and a plurality of bolts spaced apart longitudinally of the conveyor slats and the clamp members each said bolt having a head and a threaded shank said bolts being insertable upwardly through openings in the drive beam and the lower clamp member and being threadable into threaded openings in the upper clamp member, whereby said bolts can be tightened to pull the upper clamp member downwardly and firmly clamp the bottom flanges of the conveyor slat between the side portions of the upper and lower clamp members, allowing the conveyor slat to be connected to the drive beam without the needs of fastener holes in the top of the conveyor slat.

9. The apparatus of claim 8, wherein the bolts are laterally between the bottom flanges of the conveyor slat.

10. The apparatus of claim 9, comprising a pair of longitudinally spaced apart springs vertically between the upper and lower clamp members, said springs being of a size and strength sufficient to urge the upper clamp member away from the lower clamp member when the bolts are loosened, so as to define vertical spaces between the side portions of the upper and lower clamp parts into which the bottom flanges of the conveyor slat can be moved.

11. The apparatus of claim 8, wherein each side portion of the upper clamp member has opposite end parts, and each side portion of the lower clamp member has complementary end parts, and wherein when the bolts are tightened the upper and lower end parts make clamping contact with upper and lower surfaces of the conveyor slat flanges.

12. The apparatus of claim 11, wherein the side portions of the upper clamp member have recesses and projections longitudinally between their end parts that are directed downwardly towards the side portions of the lower clamp member, and the side portions of the lower clamp member have recesses and projections longitudinally between their end parts that are directed upwardly towards the side portions of the upper clamp member, wherein the projections on each clamp member are in general alignment with the recesses on the other clamp member, whereby when the bottom flanges of the conveyor slats are positioned vertically between the side portions of the upper and lower clamp members, and the bolts are tightened to pull the upper clamp member downwardly towards the lower clamp member, the projections and recesses form wrinkles in the bottom flanges of the conveyor slat which act to resist relative longitudinal movement of the conveyor slat relative to the transverse drive beam when a drive force is applied.

13. The apparatus of claim 12, wherein said bolts are laterally between the bottom flanges of the conveyor slat.

14. The apparatus of claim 13, wherein one of said upper and lower clamp members has stops on it directed towards the other clamp member, whereby the tightening of the bolts will draw the stops into contact with the other clamp member and limit the extent of clamping action of the clamp members on the bottom flanges of the conveyor slat.

15. The apparatus of claim 8, wherein the side portions of the upper clamp member have recesses and projections that are directed downwardly towards the side portions of the lower clamp member, and the side portions of the lower clamp member have recesses and projections that are directly upwardly towards the side portions of the upper clamp member, wherein the projections on each clamp member are in general alignment with the recesses on the other clamp member, whereby when the bottom flanges of the conveyor slat are positioned vertically between the side portions of the upper and lower clamp parts, and the bolts are tightened to pull the upper clamp member downwardly towards the lower clamp member, the projections and recesses form wrinkles in the bottom flanges of the conveyor slat which will act to resist relative longitudinal movement of the conveyor slat relative to the transverse drive beam when a drive force is applied.

16. The apparatus of claim 15, wherein said bolts are laterally between the bottom flanges of the conveyor slat.

17. The apparatus of claim 16, wherein one of said upper and lower clamp members have stops on it directed towards the other clamp member, whereby the tightening of the bolts will draw the stops into contact with the other clamp member and limit the extent of clamping action of the clamp members on the bottom flanges of the conveyor slat.

18. The apparatus of claim 15, comprising at least one spring vertically between the upper and lower clamp members that is of a size and strength sufficient to urge the upper clamp member away from the lower clamp member when the bolt is loosened, so as to define vertical spaces between the side portions of the upper and lower clamp parts into which the bottom flanges of the conveyor slat can be moved.

19. The apparatus of claim 18, comprising a downwardly directed upper socket in the upper clamp member and an upwardly directed lower socket in the lower clamp member, and said spring having an upper end portion in the upper socket and a lower end portion in the lower socket.

20. Apparatus for connecting a reciprocating conveyor slat having an inner space and laterally spaced apart bottom flanges, to a drive beam that is situated below the bottom flanges, said apparatus comprising:

an upper clamp member fitable into the inner space of the conveyor slat and having side portions positionable above the bottom flanges;

a lower clamp member connected to the drive beam and having side portions below the bottom flanges; and at least one bolt having a head and a threaded shank, said bolt extending downwardly from the upper clamp member and being insertable through openings in the lower clamp member and the drive beam, and being threadable into a nut that is below the drive beam, whereby said bolt can be tightened to pull the upper clamp member downwardly and firmly clamp the bottom flanges of the conveyor slat between the side portions of the upper and lower clamp members, allowing the conveyor slat to be connected to the drive beam without the use of fastener holes in the top of the conveyor slat.

21. The apparatus of claim 20, wherein the bolt is laterally between the bottom flanges of the conveyor slat.

22. The apparatus of claim 21, comprising at least one spring vertically between the upper and lower clamp members that is of a size and strength sufficient to urge the upper clamp member away from the lower clamp member when the bolt is loosened, so as to define vertical spaces between the side portions of the upper and lower clamp parts into which the bottom flanges of the conveyor slat can be moved.

23. The apparatus of claim 22, comprising a downwardly directed upper socket in the upper clamp member and an upwardly directed lower socket in the lower clamp member, and said spring having an upper end portion in the upper socket and a lower end portion in the lower socket.

24. The apparatus of claim 20, comprising a plurality of bolts spaced apart longitudinally of the conveyor slat, each said bolt being insertable downwardly from the upper clamp member through openings in the lower clamp member and the drive beam and being threadable into nuts that are below the drive beam.

25. The apparatus of claim 24, wherein said bolts are laterally between the bottom flanges of the conveyor slat.

26. The apparatus of claim 25, comprising at least two springs spaced apart longitudinally of the conveyor slat and positioned vertically between the upper and lower clamp members, said springs each being of a size and strength sufficient to urge the upper clamp member away from the lower clamp member where the bolt is loosened, so as to define spaces vertically between the side portions of the upper and lower clamp parts for receiving the bottom flanges of the conveyor slat.

27. Apparatus for connecting a reciprocating conveyor slat having an inner space and laterally spaced apart bottom flanges, to a drive beam that is situated below the bottom flanges, said apparatus comprising:

an elongated upper clamp member fitable into the inner space of the conveyor slat and having side portions positionable above the bottom flanges;

an elongated lower clamp member connected to the drive beam and having side portions below the bottom flanges; and a plurality of bolts spaced apart longitudinally of the conveyor slats and the clamp members, each said bolt having a threaded shank, said bolts being insertable downwardly from the upper clamp member through openings in the lower clamp member and the drive beam and being threadable into nuts located below the drive beam, whereby said bolts cane tightened to pull the upper clamp member downwardly and firmly clamp the bottom flanges of the conveyor slat between the side portions of the upper and lower clamp members, allowing the conveyor slat to be connected to the drive beam without the needs of fastener holes in the top of the conveyor slat.

28. The apparatus of claim 27, wherein the bolts are laterally between the bottom flanges of the conveyor slat.

29. The apparatus of claim 27, comprising a pair of longitudinally spaced apart springs vertically between the upper and lower clamp members, said springs being of a size and strength sufficient to urge the upper clamp member away from the lower clamp member when the bolts are loosened, so as to define vertical spaces between the side portions of the upper and lower clamp parts into which the bottom flanges of the conveyor slat can be moved.

30. The apparatus of claim 27, wherein each side portion of the upper clamp member has opposite end parts, and each side portion of the lower clamp member has complementary end parts, and wherein when the bolts are tightened the upper and lower end parts make clamping contact with upper and lower surfaces of the conveyor slat flanges.

31. The apparatus of claim 30, wherein the side portions of the upper clamp member have recesses and projections longitudinally between their end parts that are directed downwardly towards the side portions of the lower clamp member, and the side portions of the lower clamp member have recesses and projections longitudinally between their end parts that are directed upwardly towards the side portions of the upper clamp member, wherein the projections on each clamp member are in general alignment with the recesses on the other clamp member, whereby when the bottom flanges of the conveyor slats are positioned vertically between the side portions of the upper and lower clamp members, and the bolts are tightened to pull the upper clamp member downwardly towards the lower clamp member, the projections and recesses form wrinkles in the bottom flanges of the conveyor slat which act to resist relative longitudinal movement of the conveyor slat relative to the transverse drive beam when a drive force is applied.

32. The apparatus of claim 31, wherein said bolts are laterally between the bottom flanges of the conveyor slat.

33. The apparatus of claim 32, wherein one of said upper and lower clamp members has stops on it directed towards the other clamp member, whereby the tightening of the bolts will draw the stops into contact with the other clamp member and limit the extent of clamping action of the clamp members on the bottom flanges of the conveyor slat.

34. The apparatus of claim 27, wherein the side portions of the upper clamp member have recesses and projections that are directed downwardly towards the side portions of the lower clamp member, and the side portions of the lower clamp member have recesses and projections that are directly upwardly towards the side portions of the upper clamp member, wherein the projections on each clamp member are in general alignment with the recesses on the other clamp member, whereby when the bottom flanges of the conveyor slat are positioned vertically between the side portions of the upper and lower clamp parts, and the bolts are tightened to pull the upper clamp member downwardly towards the lower clamp member, the projections and recesses form wrinkles in the bottom flanges of the conveyor slat which will act to resist relative longitudinal movement of the conveyor slat relative to the transverse drive beam when a drive force is applied.

35. The apparatus of claim 34, wherein said bolts are laterally between the bottom flanges of the conveyor slat.

36. The apparatus of claim 35, wherein one of said upper and lower clamp members have stops on it directed towards the other clamp member, whereby the tightening of the bolts will draw the stops into contact with the other clamp member and limit the extent of clamping action of the clamp members on the bottom flanges of the conveyor slat.

37. The apparatus of claim 34, comprising at least one spring vertically between the upper and lower clamp members that is of a size and strength sufficient to urge the upper clamp member away from the lower clamp member when the bolt is loosened, so as to define vertical spaces between the side portions of the upper and lower clamp parts into which the bottom flanges of the conveyor slat can be moved.

38. The apparatus of claim 37, comprising a downwardly directed upper socket in the upper clamp member and an upwardly directed lower socket in the lower clamp member, and said spring having an upper end portion in the upper socket and a lower end portion in the lower socket.

39. Apparatus for connecting a reciprocating conveyor slat having an inner space and laterally spaced apart bottom flanges, to a drive beam that is situated below the bottom flanges, said apparatus comprising:
an upper clamp member fitable into the inner space of the conveyor slat and having side portions positionable above the bottom flanges;
a lower clamp member connected to the drive beam and having side portions below the bottom flanges; and
at least one bolt having a head and a threaded shank, said bolt being insertable downwardly through openings in the upper clamp member, the lower clamp member and the drive beam, and being threadable into a threaded opening in a nut positioned below the drive beam, whereby said bolt can be tightened to pull the upper clamp member downwardly and firmly clamp the bottom flanges of the conveyor slat between the side portions of the upper and lower clamp members, allowing the conveyor slat to be connected to the drive beam without the use of fastener holes in the top of the conveyor slat.

40. The apparatus of claim 39, wherein the bolt is laterally between the bottom flanges of the conveyor slat.

41. The apparatus of claim 39, comprising a plurality of bolts spaced apart longitudinally of the conveyor slat, each said bolt being insertable upwardly through openings in the drive beam and the clamp members and each being threadable into a threaded opening in a nut.

42. The apparatus of claim 41, wherein said bolts are laterally between the bottom flanges of the conveyor slat.

43. The apparatus of claim 39, in which the upper clamp member includes a recess region in its upper portion sized to snugly receive the head of the bolt, said recess having spaced apart wrench surfaces adapted to grip and hold on to wrench surfaces on opposite sides of the bolt, so that the nut can be rotated relative to the bolt and the bolt will be held by the wrench surfaces in the upper clamp member.

44. The apparatus of claim 43, wherein the bolt head receiving recess extends longitudinally of the upper clamp member and the wrench surfaces in the recess extend longitudinally of the upper clamp member.

45. The apparatus of claim 43, wherein the bolt head receiving region is a socket in the upper portion of the upper clamp member, said socket having spaced apart wrench surfaces that extend substantially crosswise of the upper clamp member.

46. Apparatus for connecting a reciprocating conveyor slat having an inner space and laterally spaced apart bottom flanges, to a drive beam that is situated below the bottom flanges, said apparatus comprising:
an elongated upper clamp member fitable into the inner space of the conveyor slat and having side portions positionable above the bottom flanges;
an elongated lower clamp member connected to the drive beam and having side portions below the bottom flanges; and
a plurality of bolts spaced apart longitudinally of the conveyor slats and the clamp members, each said bolt having a head and a threaded shank, said bolts being insertable upwardly through openings in the drive beam and the clamp members and being threadable into threaded openings, whereby said bolts can be tightened to pull the upper clamp member downwardly and firmly clamp the bottom flanges of the conveyor slat between the side portions of the upper and lower clamp members; and
wherein the lower clamp member is formed into an upper wall of the drive beam.

47. The apparatus of claim 46, wherein the drive beam has a top portion formed of plate metal and the lower clamp member is stamped formed into said top portion.

48. The apparatus of claim 47, wherein the upper clamp member has recesses and projections that are directed downwardly towards the lower clamp member and the lower clamp member has recesses and projections directed upwardly towards the upper clamp member, wherein the projections on each clamp member are in general alignment with the recesses on the other clamp member, whereby when the bottom flanges of the conveyor slats are positioned vertically between the side portions of the upper and lower clamp members, and the bolts are tightened to pull the upper clamp member downwardly towards the lower clamp member, the projections and recesses form wrinkles in the bottom flanges of the conveyor slat which act to resist longitudinal movement of the conveyor slat relative to the transverse drive beam when a drive force is applied.

49. A method of attaching conveyor slats to drive beams, said conveyor slats having a top, a pair of laterally spaced apart side parts depending from the top, and a pair of bottom flanges projecting inwardly from the side parts, said top, bottom flanges and side parts together defining a slat inner space that is horizontally between the side parts and vertically between the top and the bottom flanges, said method comprising:

provided a connector for each slat, said connector being a clamp and including a lower clamp member having upwardly directed clamp surfaces, and an upper clamp member having downwardly directed clamp surfaces;

connecting the lower clamp member to a drive beam, with its clamp surfaces directed upwardly;

positioning the upper clamp member over the lower clamp member, with its clamp surfaces directed downwardly;

positioning the conveyor slat so as to position the upper clamp member inside of the conveyor slat, horizontally between the side parts of the conveyor slat and vertically between the top and the bottom flanges;

positioning the bottom flanges of the conveyor slat vertically between the clamping surfaces of the clamp members;

providing at least one bolt having a threaded shank extending downwardly from the upper clamp member;

inserting the threaded shank of the bolt through openings in the clamp members; and threading the bolt into a nut so as to pull the upper clamp member downwardly and firmly clamp the bottom flanges of the conveyor slat between the side portions of the upper and lower clamp members.

50. The method of claim 49, further comprising locating at least one spring between the upper and lower clamp members for urging the upper clamp member upwardly away from the lower clamp member when the bolt is loosened, so as to define vertical spaces between the side portions of the upper clamp member and the side portions of the lower clamp member into which the bottom flanges of the conveyor slat may be received.

51. The method of claim 50, comprising positioning the bolt laterally between the bottom flanges of the conveyor slat.

52. The method of claim 51, comprising positioning the bolt and the spring laterally between the bottom flanges of the conveyor slat.

53. The method of claim 49, comprising providing the side portions of the upper clamp member with recesses and projections that are directed downwardly towards the side portions of the lower clamp member, and providing the side portions of the lower clamp member with recesses and projections that are directed upwardly towards the side portions of the upper clamp member, positioning the projections on each clamp member in general alignment with the recesses on the other clamp member; after positioning the bottom flanges of the conveyor slat vertically between the side portions of the upper and lower clamp parts, tightening the nut on the bolt to pull the upper clamp member downwardly towards the lower clamp member, and caused the projections and recesses to form wrinkles in the bottom flanges of the conveyor slat which will act to resist relative longitudinal movement of the conveyor slat relative to the transverse drive beam when a drive force is applied.

54. The method of claim 53, comprising providing stops on at least one of the clamp members which are directed towards the other clamp member, and using the stops to contact the other clamp member and limit the extent of clamping action of the clamp members on the bottom flanges of the conveyor slat.

55. The method of claim 49, comprising providing guide bearings for the conveyor slats of a type onto which the conveyor slats can be snap fitted, positioning each conveyor slat over its bearings and its lower clamp member, with its bolt aligned with bolt receiving openings in the lower clamp member and the drive beam, then pushing down on the conveyor slat so as to snap the conveyor slat onto its bearings and move the bolt through the bolt receiving openings in the lower clamp member and the drive beam, and from below the drive beam, attaching a nut onto the bolt and tighten the nut so as to draw the upper clamp member downwardly and clamp the conveyor slat bottom flanges between the two clamp members.

56. The method of claim 49, further comprising building the nut into the upper clamp member.

57. The method of claim 49, further comprising providing the upper portion of the upper clamp member with a bolt head receiving recess, inserting the bolt downwardly and its head into the recess, and connecting a nut to the bolt below the drive beam.

* * * * *